(12) United States Patent
Oakes

(10) Patent No.: US 10,343,704 B2
(45) Date of Patent: Jul. 9, 2019

(54) FOLDABLE STROLLER FRAME

(71) Applicant: Stroller Tech Limited, Central (HK)

(72) Inventor: Michael John Oakes, Ipswich (GB)

(73) Assignee: Stroller Tech Limited, Central (HK)

( * ) Notice: Subject to any disclaimer, the term of this patent is extended or adjusted under 35 U.S.C. 154(b) by 0 days.

(21) Appl. No.: 15/623,674

(22) Filed: Jun. 15, 2017

(65) Prior Publication Data

US 2018/0022372 A1    Jan. 25, 2018

(30) Foreign Application Priority Data

Jul. 19, 2016    (GB) .................................. 1612455.4

(51) Int. Cl.
  *B62B 7/06*    (2006.01)
  *B62B 9/20*    (2006.01)
  *B62B 7/08*    (2006.01)

(52) U.S. Cl.
  CPC ................ *B62B 7/062* (2013.01); *B62B 7/08* (2013.01); *B62B 7/083* (2013.01); *B62B 9/20* (2013.01); *B62B 2202/12* (2013.01); *B62B 2205/26* (2013.01)

(58) Field of Classification Search
  CPC . B62B 7/062; B62B 2205/26; B62B 2202/12; B62B 7/08; B62B 9/20; B62B 7/083
  See application file for complete search history.

(56) References Cited

U.S. PATENT DOCUMENTS

| 5,207,439 | A | 5/1993 | Mortenson |
| 6,357,784 | B1 * | 3/2002 | Mitzman ................... B62B 7/02 280/30 |
| 7,422,230 | B2 * | 9/2008 | Chuan ....................... B62B 7/08 280/642 |
| 7,862,054 | B2 * | 1/2011 | Fiore, Jr. ................... B62B 9/24 280/47.38 |
| 7,883,104 | B2 * | 2/2011 | Driessen ................... B62B 7/08 280/642 |

(Continued)

FOREIGN PATENT DOCUMENTS

| DE | 202004002298 U1 | 5/2004 |
| EP | 2441645 A1 | 4/2012 |

(Continued)

OTHER PUBLICATIONS

European Search Report and Opinion dated Dec. 14, 2017, in connection with EP17177014.

(Continued)

*Primary Examiner* — Jacob B Meyer
(74) *Attorney, Agent, or Firm* — Downs Rachlin Martin PLLC

(57) ABSTRACT

A foldable stroller frame comprising a lower frame. The lower frame has a front frame section and a rear frame section which are pivotal relative to one another. The lower frame also has a hinge device linking the front frame section to the rear frame section. The hinge device has at least two parts pivotally coupled together and rotatable about a movable axis of rotation between a deployed state and a collapsed state. The hinge device also has a handle arranged along the axis of rotation for grasping by a user to enable the hinge device to be operated.

23 Claims, 21 Drawing Sheets

(56) References Cited

U.S. PATENT DOCUMENTS

| | | | | |
|---|---|---|---|---|
| 8,061,732 B2* | 11/2011 | Song | B62B 7/08 | 280/639 |
| 8,172,254 B2* | 5/2012 | Park | B62B 5/065 | 280/47.38 |
| 8,191,919 B2* | 6/2012 | Wang | B62B 7/08 | 280/642 |
| 8,398,111 B2* | 3/2013 | Mival | B62B 7/08 | 280/648 |
| 8,408,580 B2* | 4/2013 | Liao | B62B 7/086 | 280/642 |
| 8,870,215 B2* | 10/2014 | Li | B62B 9/00 | 280/647 |
| 8,894,090 B1* | 11/2014 | Chen | B62B 7/086 | 280/47.38 |
| 8,936,267 B2* | 1/2015 | Li | B62B 7/08 | 280/642 |
| 8,979,114 B2* | 3/2015 | Cheng | B62B 7/062 | 280/642 |
| 8,991,854 B2* | 3/2015 | Greger | B62B 7/08 | 280/650 |
| 9,096,250 B2* | 8/2015 | Cheng | B62B 7/068 | |
| 9,346,479 B1* | 5/2016 | Ransil | B62B 7/064 | |
| 9,393,982 B2* | 7/2016 | Tomasi | B62B 7/08 | |
| 9,517,786 B2* | 12/2016 | Chang | B62B 7/08 | |
| 9,540,028 B2* | 1/2017 | Taylor | B62B 7/10 | |
| 9,561,816 B2* | 2/2017 | Dowd | B62B 7/08 | |
| 9,638,243 B2* | 5/2017 | Li | B62B 7/08 | |
| 9,815,487 B2* | 11/2017 | Dowd | B62B 7/08 | |
| 9,855,964 B2* | 1/2018 | Sack | B62B 7/10 | |
| D815,567 S * | 4/2018 | Oakes | D12/129 | |
| D815,568 S * | 4/2018 | Oakes | D12/129 | |
| 10,023,217 B2* | 7/2018 | Sack | B62B 7/062 | |
| 2004/0222615 A1* | 11/2004 | Cheng | B62B 7/08 | 280/642 |
| 2006/0237949 A1* | 10/2006 | Hou | B62B 7/08 | 280/642 |
| 2008/0088116 A1* | 4/2008 | Den Boer | B62B 7/062 | 280/650 |
| 2008/0191451 A1* | 8/2008 | Driessen | B62B 7/08 | 280/650 |
| 2008/0315562 A1* | 12/2008 | Song | B62B 7/08 | 280/650 |
| 2011/0074124 A1* | 3/2011 | Schnarr | B62B 1/12 | 280/30 |
| 2012/0025495 A1* | 2/2012 | Minato | B62B 7/062 | 280/648 |
| 2012/0187660 A1* | 7/2012 | Liao | B62B 7/086 | 280/642 |
| 2013/0113186 A1* | 5/2013 | Rembisz | B62B 7/06 | 280/647 |
| 2013/0134692 A1* | 5/2013 | Cheng | B62B 7/062 | 280/642 |
| 2013/0240577 A1* | 9/2013 | Li | B62B 7/08 | 224/159 |
| 2014/0064829 A1* | 3/2014 | Li | B62B 7/08 | 403/81 |
| 2014/0327233 A1* | 11/2014 | Greger | B62B 7/08 | 280/650 |
| 2015/0008659 A1* | 1/2015 | Chang | B62B 7/08 | 280/650 |
| 2015/0076777 A1* | 3/2015 | Cheng | B62B 7/068 | 280/42 |
| 2015/0197268 A1* | 7/2015 | Dowd | B62B 7/08 | 280/650 |
| 2017/0166234 A1* | 6/2017 | Dowd | B62B 7/08 | |
| 2017/0174244 A1* | 6/2017 | Sack | B62B 7/062 | |
| 2017/0217470 A1* | 8/2017 | Popp | B62B 7/004 | |
| 2017/0240197 A1* | 8/2017 | Oakes | B62B 7/142 | |
| 2018/0022372 A1* | 1/2018 | Oakes | B62B 7/062 | 280/642 |
| 2018/0215405 A1* | 8/2018 | Lin | B62B 7/06 | |

FOREIGN PATENT DOCUMENTS

| | | |
|---|---|---|
| EP | 2565101 A2 | 3/2013 |
| GB | 2314052 A | 12/1997 |
| GB | 2408489 A | 6/2005 |
| GB | 1415418.1 A | 3/2016 |
| NL | 1030329 C2 | 5/2007 |
| WO | 2013092600 A1 | 6/2013 |

OTHER PUBLICATIONS

Search Report dated Jan. 4, 2017, in connection with GB1612455.4.

* cited by examiner

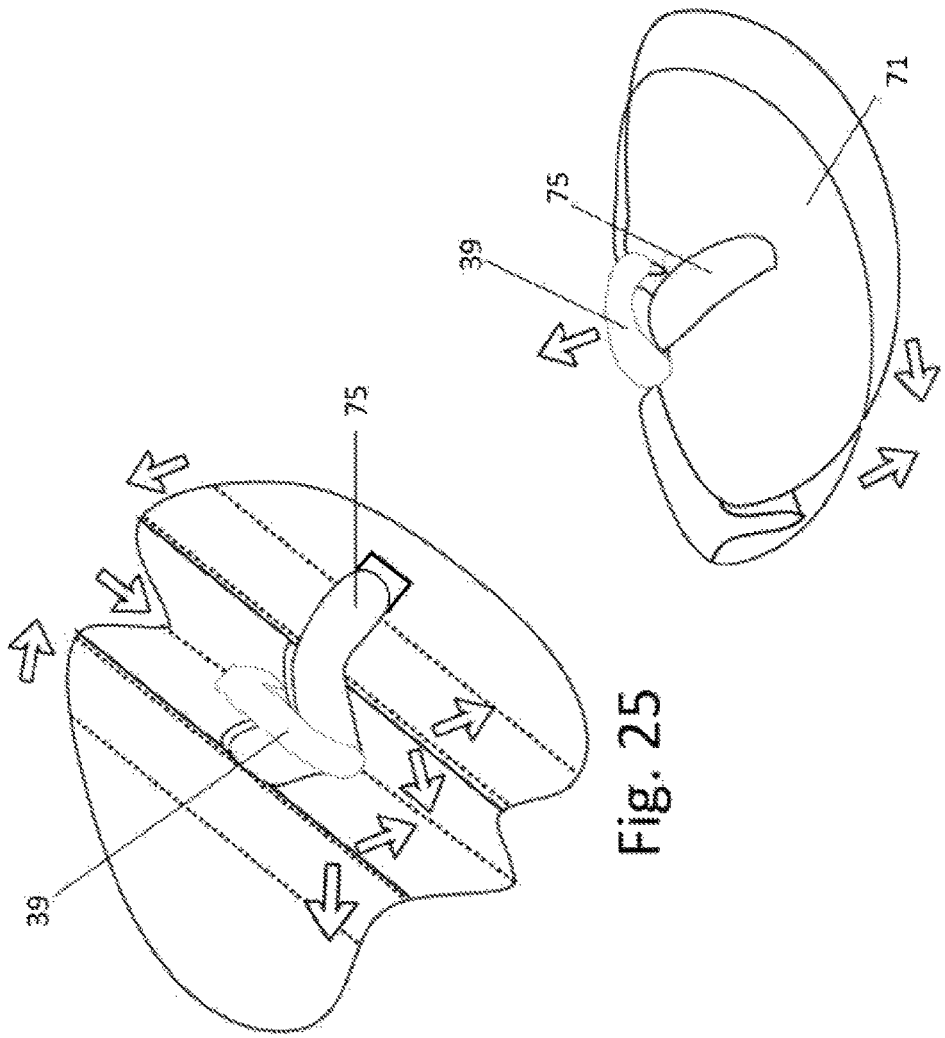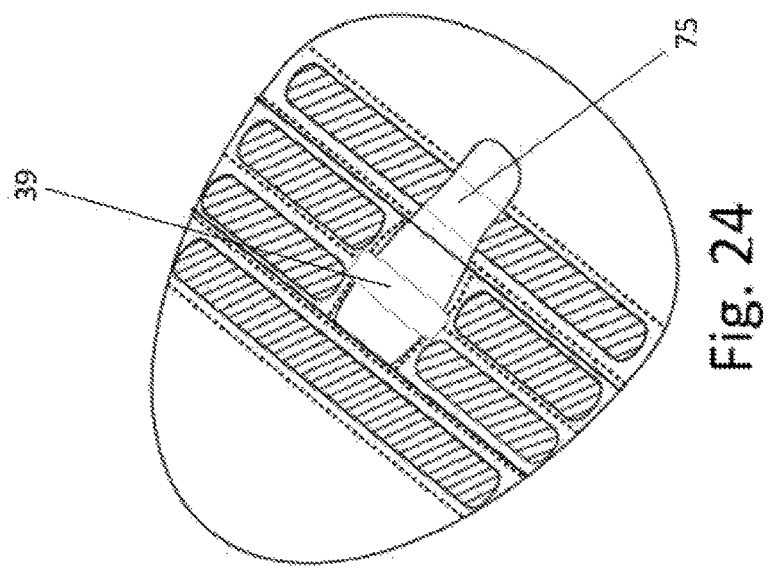

FOLDABLE STROLLER FRAME

FIELD OF THE INVENTION

The present invention relates to a foldable stroller frame, where stroller is sometimes referred to as a perambulator, buggy, pushchair or pram.

BACKGROUND

Foldable strollers have been in use for many years and are a preferred means for transporting babies and infants due to their ability to collapse into compact units when not in use. The ability to fold and collapse a stroller into a compact unit is especially useful as it enables the stroller to be stored in relatively small spaces and also maneuvered and transported.

A problem with existing foldable strollers is that the collapsing mechanisms tend to be overly complicated, prone to damage, unwieldy or cumbersome to use.

It is an object of the present invention to provide an improved foldable stroller frame.

SUMMARY OF THE DISCLOSURE

In accordance with a first aspect of the present invention, there is provided a foldable stroller frame comprising a lower frame, the lower frame comprising a front frame section, a rear frame section and a hinge device linking the front frame section to the rear frame section, the front frame section being pivotally connected to the rear frame section, wherein the hinge device comprises at least two coupled parts rotatable about a movable axis of rotation and a handle arranged along the movable axis of rotation for grasping by a user to operate the hinge device for pivotal movement of the front frame section relative to the rear frame section between a deployed state and a collapsed state.

Advantageously, a single hinge device with a handle arranged along the axis of rotation of the hinge device enables the foldable stroller frame to be folded into a collapsed state or unfolded to a deployed state with a single, one handed movement in which the front frame section is pivoted toward or away from the lower frame section in unison. Thus, a stroller frame according to the present invention may be collapsed or deployed more smoothly and reliably than existing foldable stroller frames.

The hinge device may define a surface for supporting a basket in the deployed state. The hinge device may be pivotally attached to the front frame section and the rear frame section. The lower frame may further comprise a latch mechanism operable to latch the front frame section to the rear frame section in the collapsed state. The hinge device may form a brace between the front frame section and the rear frame section in the deployed state.

The foldable stroller frame may further comprise a basket having a base with an aperture through which the handle may be grasped. The base may further comprise one or more closure means to at least substantially close the aperture. One or more closure means may be hingeably attached to one side of the aperture. One or more closure means may comprise a fastening means to fasten the closure means to the base. One or more closure means may be a flap.

The base may further comprise one or more preformed folds extending in a direction substantially parallel to the movable axis of rotation of the hinge device such that the base is foldable along one or more of the preformed folds. The base may comprise a plurality of preformed folds spaced apart to define one or more segments arranged to concertina together upon folding of the base. The segments may be reinforced by a rigid material. The rigid material may comprise polyethylene.

Two coupled parts of the at least two coupled parts of the hinge device may comprise interfacing formations which together define a space, each formation having one or more shaped features for engagement with one or more correspondingly shaped features of a locking member mounted within the space, the locking member may be moveable between an unlocked position in which the two coupled parts are relatively moveable and a locked position in which the two coupled parts are fixed relative to each other, the locking member engaging only one formation in the unlocked position and engaging both formations in the locked position. The hinge device may further comprise a depressible button for urging the locking member from the locked position to the unlocked position. A linkage may be arranged between the depressible button and the locking member and the depressible button and the linkage may comprise mutually engaging ramped surfaces arranged such that the linkage is urged by the depressible button to move the locking member from the locked position to the unlocked position upon depression of the depressible button. The locking member may be biased toward the locked position. The locking member may be mounted to a hinge pin of the hinge device.

The handle may be arranged on one of the at least two parts of the hinge device. The handle may be integrally formed with one of the at least two parts of the hinge device. The hinge device may be biased toward the deployed state.

In accordance with a second aspect of the present invention, there is provided a stroller comprising a foldable stroller frame according to the first aspect and one or more seats attached to the foldable stroller frame.

In accordance with a third aspect of the present invention, there is provided a method of folding a foldable stroller frame having a lower frame comprising two pivotally connected frame sections linked by a hinge device, the hinge device having a handle arranged along an axis of rotation of the hinge device, the method comprising the steps of pulling the handle in an upward direction to cause the hinge device to draw the pivotally connected frame sections together into a collapsed state.

The method may further comprise the steps of using the handle to carry the foldable stroller frame in the collapsed state.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 24 shows a third stage of interaction with the foldable stroller frame shown in FIG. 1;

FIG. 25 shows a first stage of interaction between the foldable stroller frame shown in FIG. 1 and the base during a folding operation;

FIG. 26 shows a second stage of interaction between the foldable stroller frame shown in FIG. 1 and the base during a folding operation;

DETAILED DESCRIPTION

Figure 1:
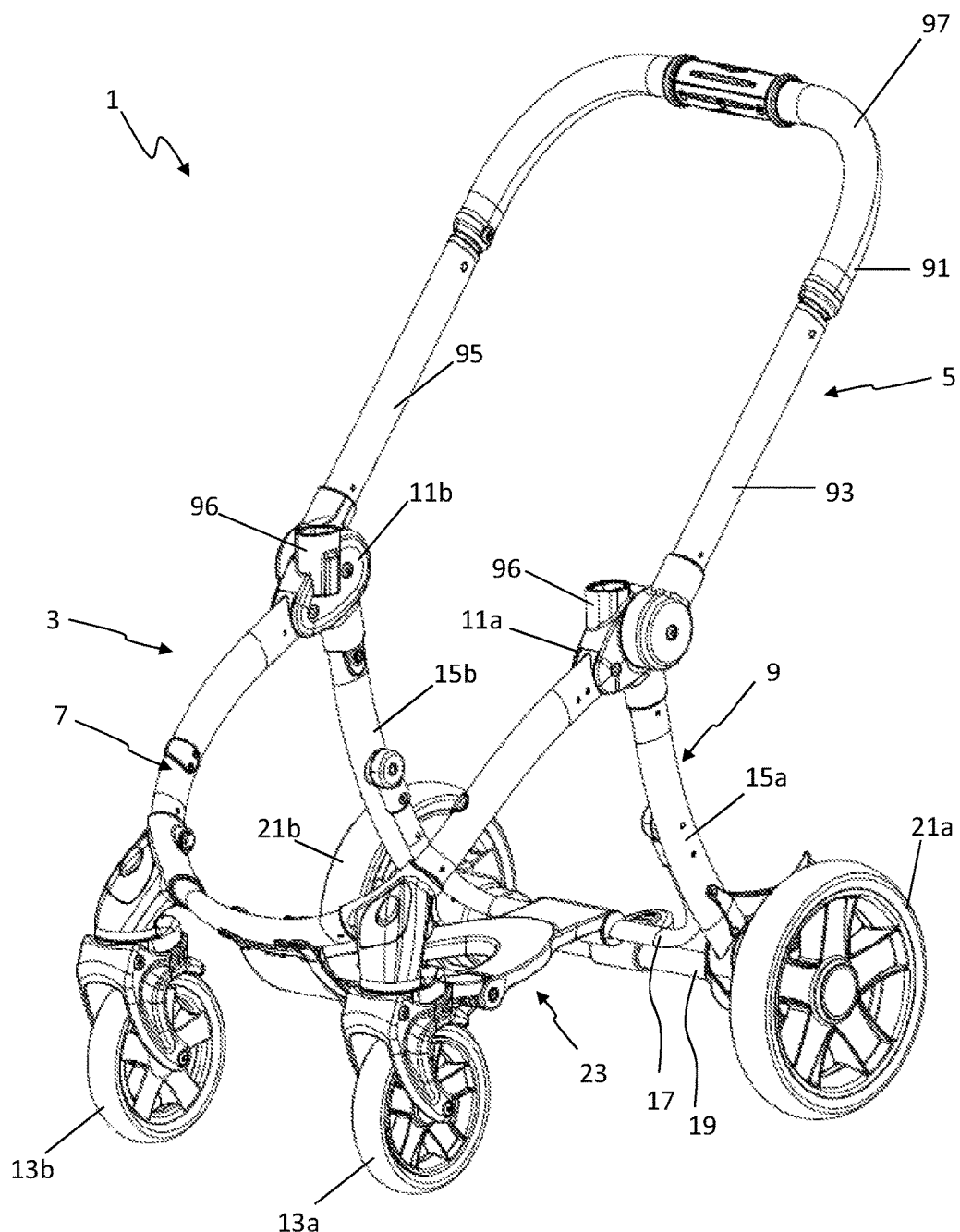
FIG. 1 is a front perspective view of a foldable stroller frame according to an embodiment of the present invention when in a deployed state.

Referring to the figures and, in particular FIGS. 1 to 6, there is shown a foldable stroller frame 1 comprising a lower frame 3 and an upper frame 5. The lower frame 3 comprises a front frame section 7 and a rear frame section 9 which are connected to a pair of hubs 11a, 11b on opposite sides respectively of the foldable stroller frame 1. The front frame section 7 is pivotally attached to the hubs 11a, 11b so as to be relatively rotatable toward the rear frame section 9. A pair of wheels 13a, 13b is rotatably mounted to the front frame section 7 to enable steering of the stroller frame 1. The rear frame section 9 comprises a pair of rear side limbs 15a, 15b connected by a tubular cross brace 17, and a rear axle 19 to which a pair of rear wheels 21a, 21b are attached. The rear side limbs 15a, 15b are attached between the hubs 11a, 11b and the rear axle 19 to form a stable rear frame section 9.

The lower frame 3 further comprises a hinge device 23 which is pivotally connected at one end to the cross brace 17 and at the opposite end to a part of the front frame section 7 so as to link the front frame section 7 to the rear frame section 9. The hinge device 23 is made from moulded plastics material and comprises a first hinge part 25 and a second hinge part 27 which are pivotally coupled together by a hinge pin 29 which extends through interconnecting ends of the first and second hinge parts 25, 27 respectively. Thus, the first hinge part 25 and the second hinge part 27 are pivotal relative to one another about the hinge pin 29 which defines an axis of rotation. Since the first and second hinge parts 25, 27 are pivotally connected to the front and rear frame sections 7, 9 respectively, the axis of rotation is movable in a direction toward the hubs 11a, 11b as indicated by arrow 31 in FIG. 2.

Figure 2:
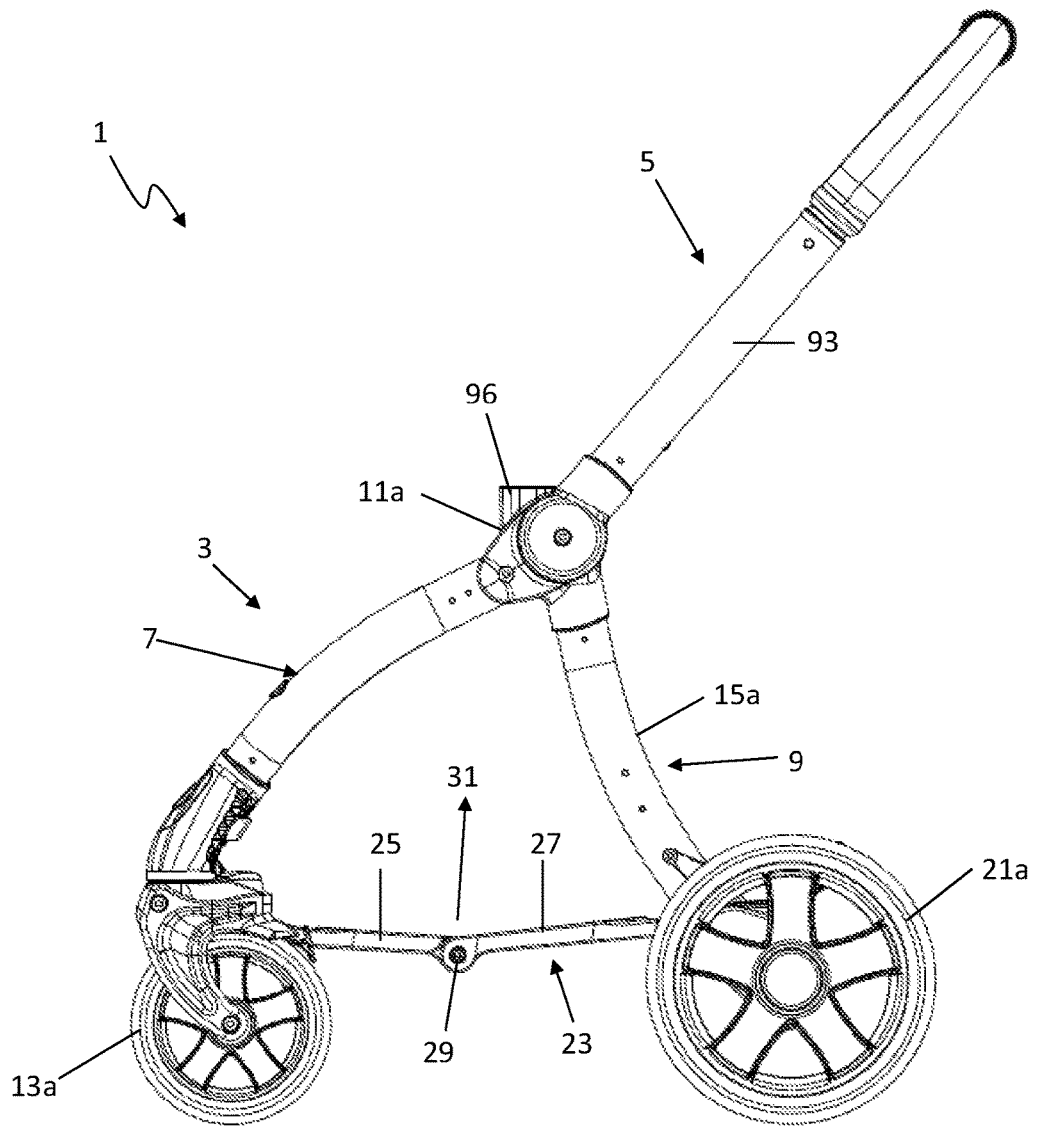
FIG. 2 is a side view of the foldable stroller frame shown in FIG. 1.

Hinging of the hinge device 23 in a direction away from the hubs 11a, 11b is limited by a stop (not shown) which is configured to stop the hinge device in a position at which the hinge device 23 extends between the front and rear frame sections 7, 9 in a deployed state (as shown in FIG. 2). In this position, the first hinge part 25 and the second hinge part 27 rest slightly beyond horizontal so as to be locked in the deployed state by an over-dead-centre principle.

In the embodiment depicted, both the first hinge part 25 and the second hinge part 27 are configured to connect to the front frame section 7 and the rear frame section 9, respectively at a single point of contact. The second hinge part 27 is pivotally attached to the cross brace 17 by a pair of semi-cylindrical mouldings 33, 35 which capture the cross brace 17 and rotate about a bearing 37 which is arranged between the formations 33, 35 and the cross brace 17. The size of the mouldings 33, 35 is chosen so as to extend along the cross brace 17 a sufficient distance to ensure a strong connection between the hinge device 23 and the cross brace 17. The second hinge part 27 further comprises an integrally formed handle 39 arranged at the opposite end respectively from the cross brace 17 and which extends along the axis of rotation. The handle 39 has a hollow passage through which the hinge pin 29 extends.

The first hinge part 25 is approximately 'Y' shaped having two formations 41, 43 arranged at each end respectively of the handle 39 of the second hinge part 27 and configured to interconnect with the second hinge part 27. The two formations 41, 43 each comprise a bore for receipt of an end of the hinge pin 29 extending through the handle 39. The opposite end from the two formations 41, 43 is hingedly attached to the front frame section 7 at a single point of attachment to enable the first hinge part 25 to pivot relative to the front frame section 7. The hinge device 23 comprises one or more torsion springs arranged to bias the hinge device toward the extended position shown in FIG. 2.

Figure 13:
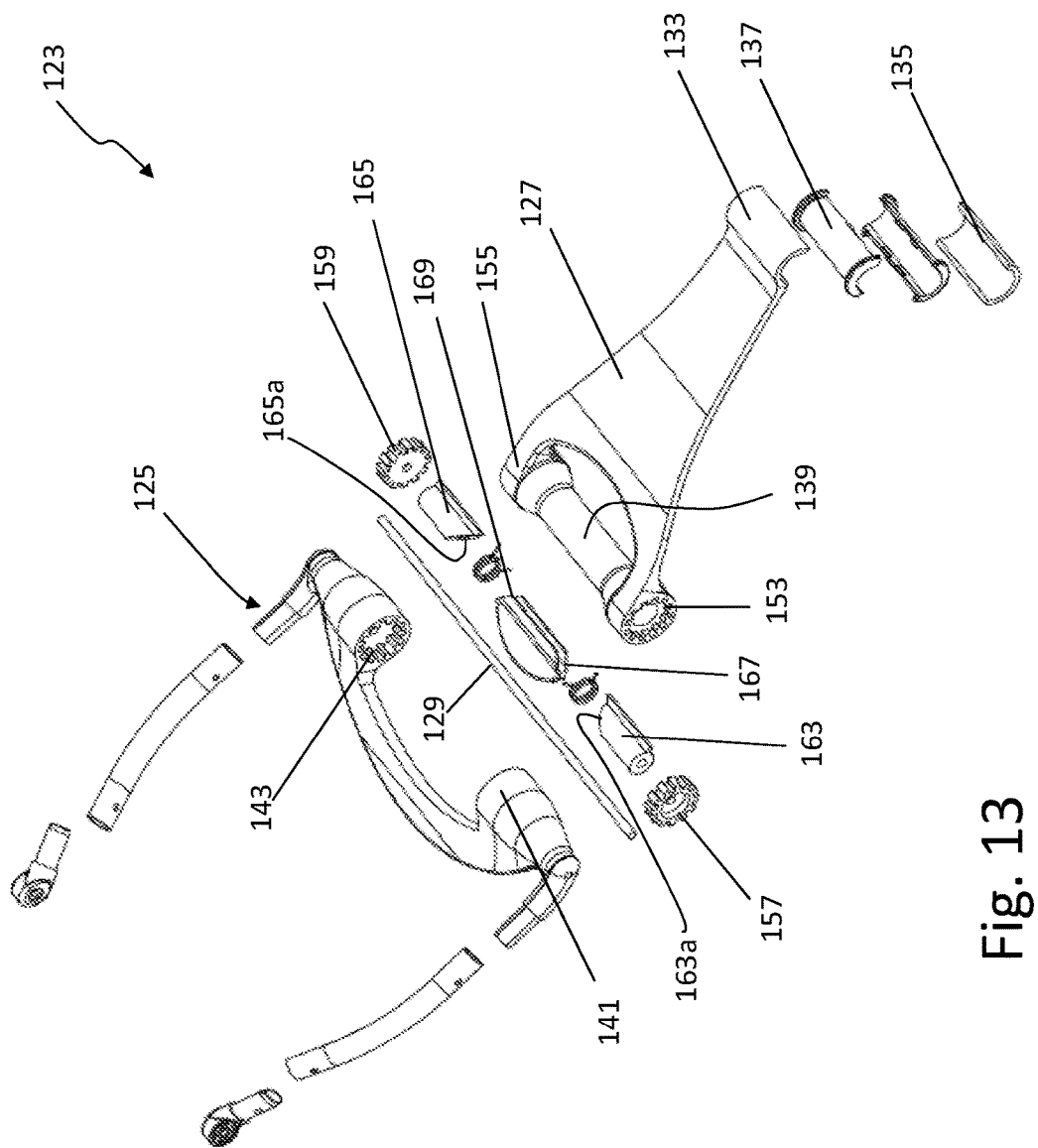
FIG. 13 is an exploded view of a hinge device of an alternative embodiment of a foldable stroller frame according to the present invention.
Figure 14:
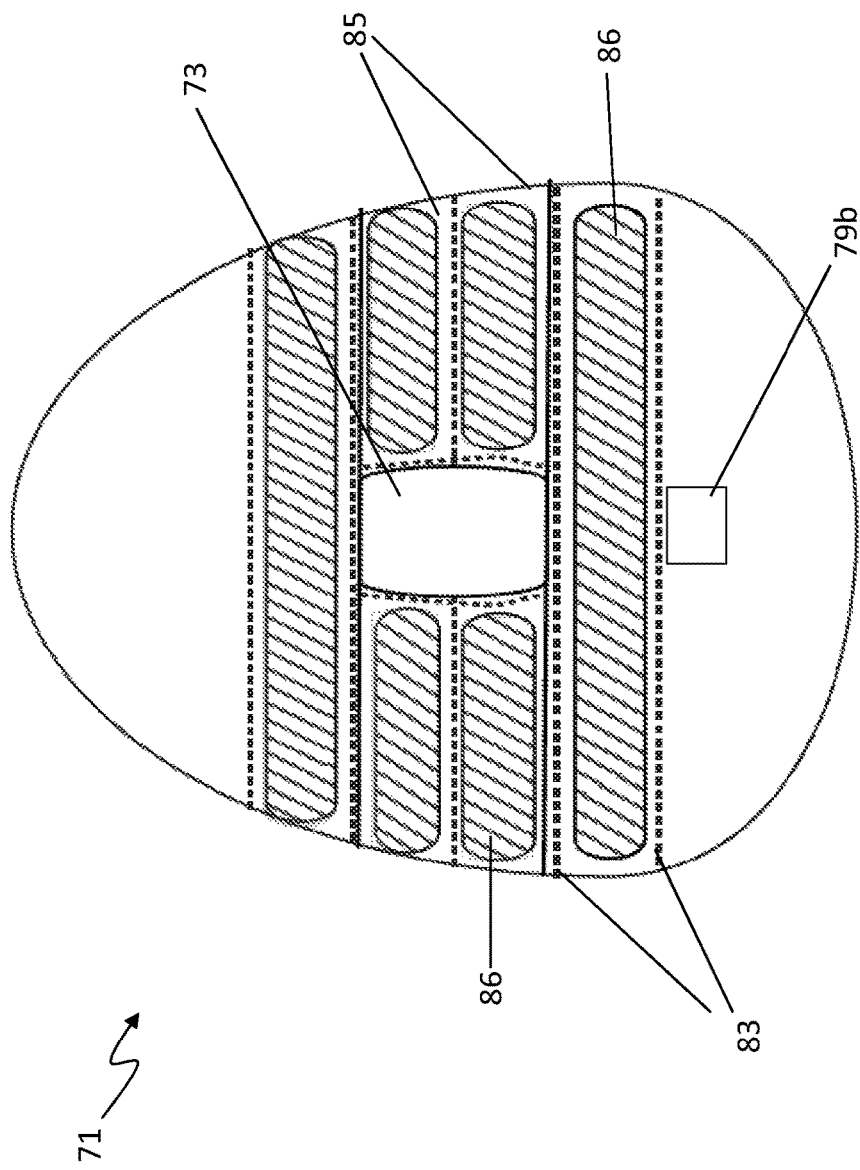
FIG. 14 is a plan view of a base of the basket shown in FIG. 7.
Figure 15:
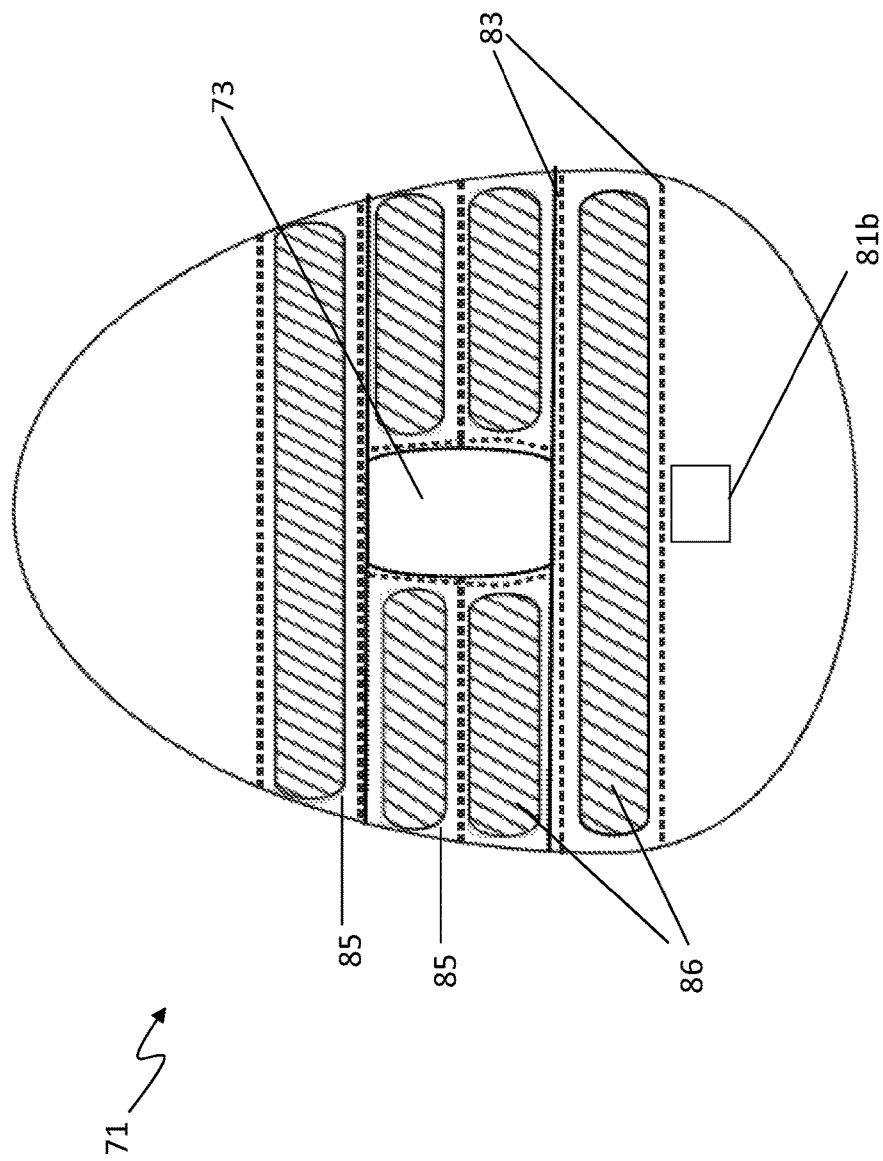
FIG. 15 is an underside view of the base shown in FIG. 14.
Figure 17:
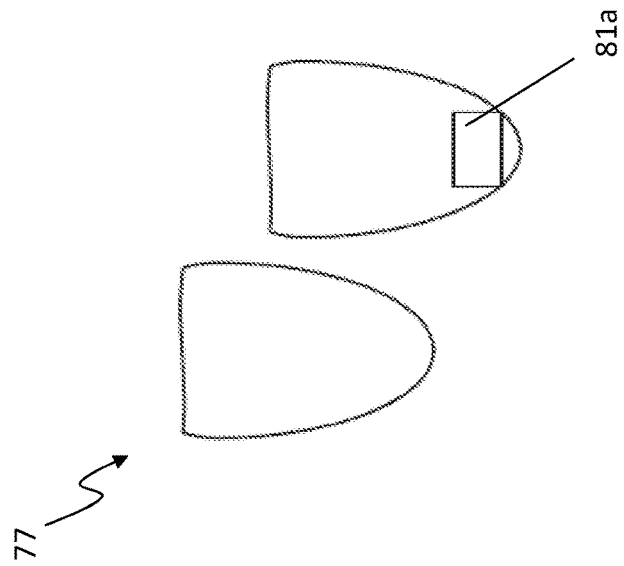
FIG. 17 shows upper and lower side views of an underside flap of the base shown in FIG. 14.
Figure 16:
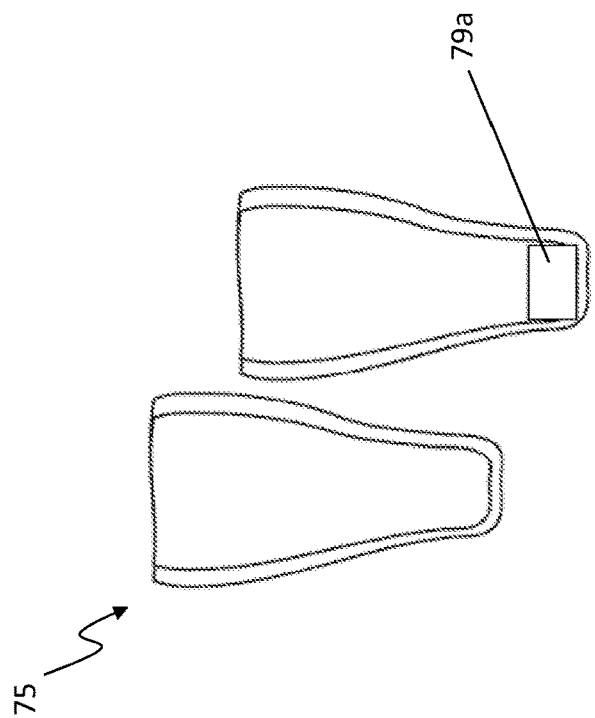
FIG. 16 shows upper and lower side views of an upper flap of the base shown in FIG. 14.
Figure 19:
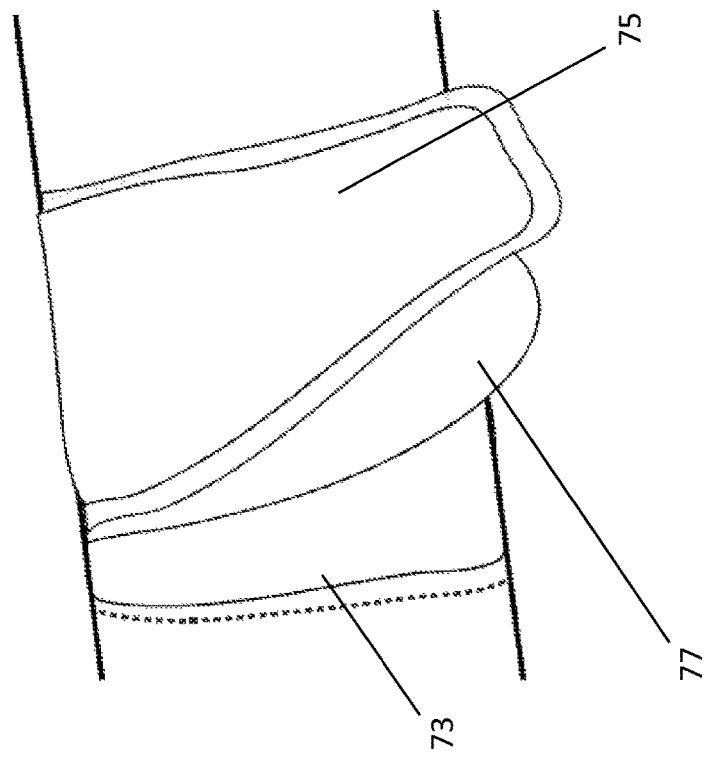
FIG. 19 shows an enlarged view of the upper and underside flaps shown in FIG. 18.
Figure 18:
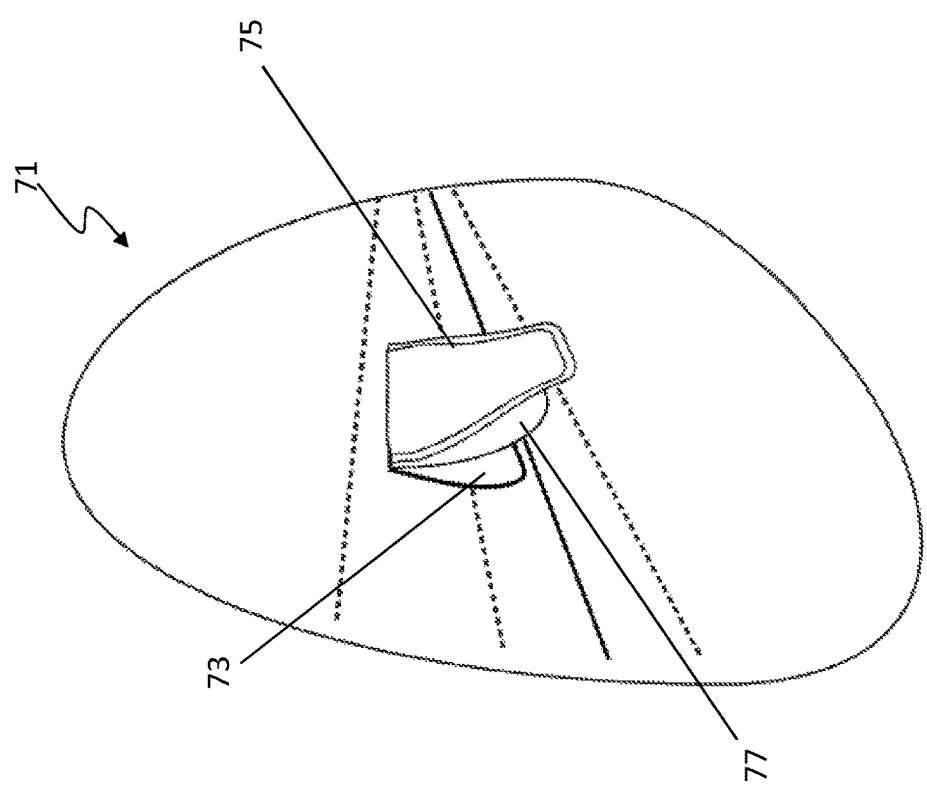
FIG. 18 shows a perspective view of the base shown in FIG. 14 with the upper flap shown in FIG. 16 and the underside flap shown in FIG. 17 attached.

Whilst the hinge device 23 of the embodiment depicted in FIGS. 1 to 6 has single point of attachment to the front and rear frame sections 7, 9 respectively, with reference to FIG. 13, it is envisaged that there may be more than one point of attachment, provided the attachments provide a solid, stable connection between the hinge device 23 and the frame sections 7, 9.

Figure 3:
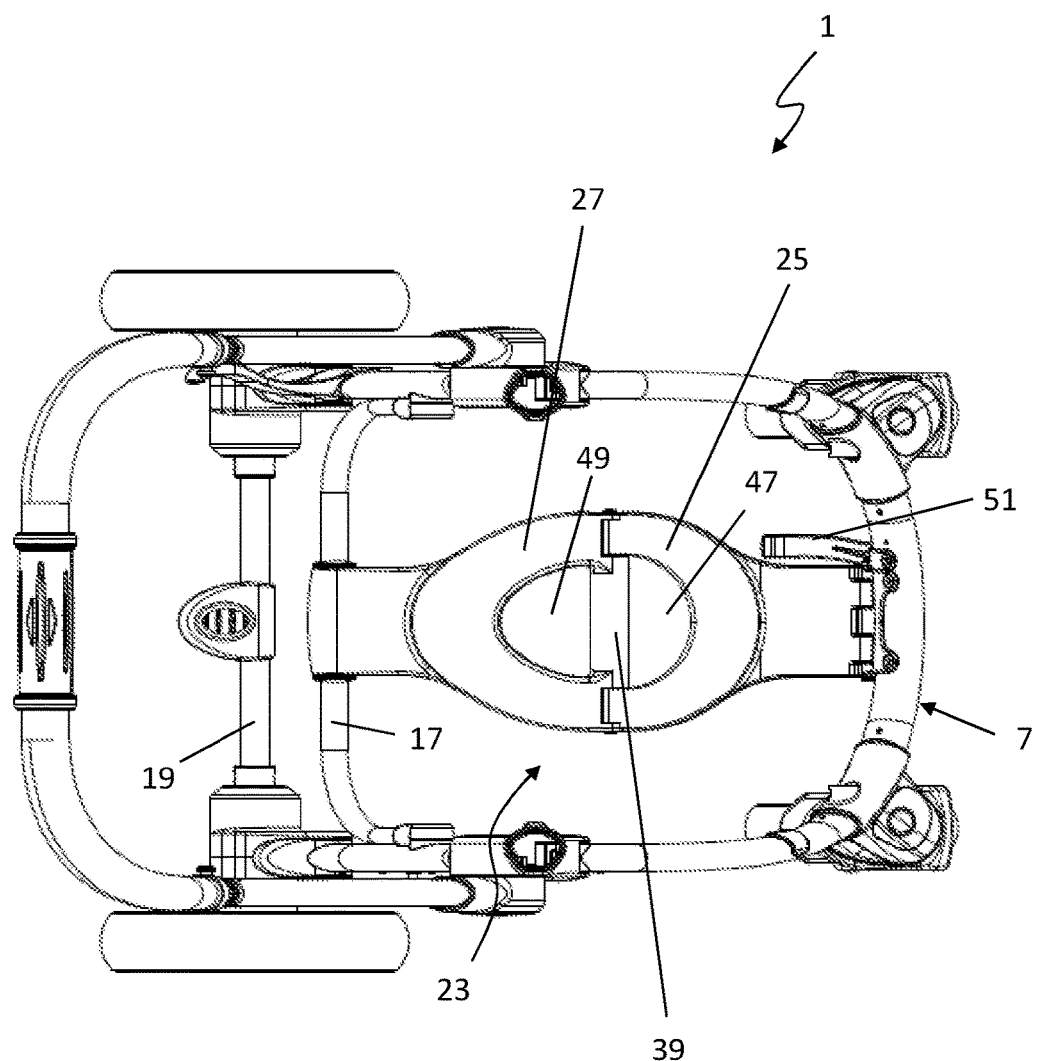
FIG. 3 is a plan view of the foldable stroller frame shown in FIG. 1.
Figure 4:
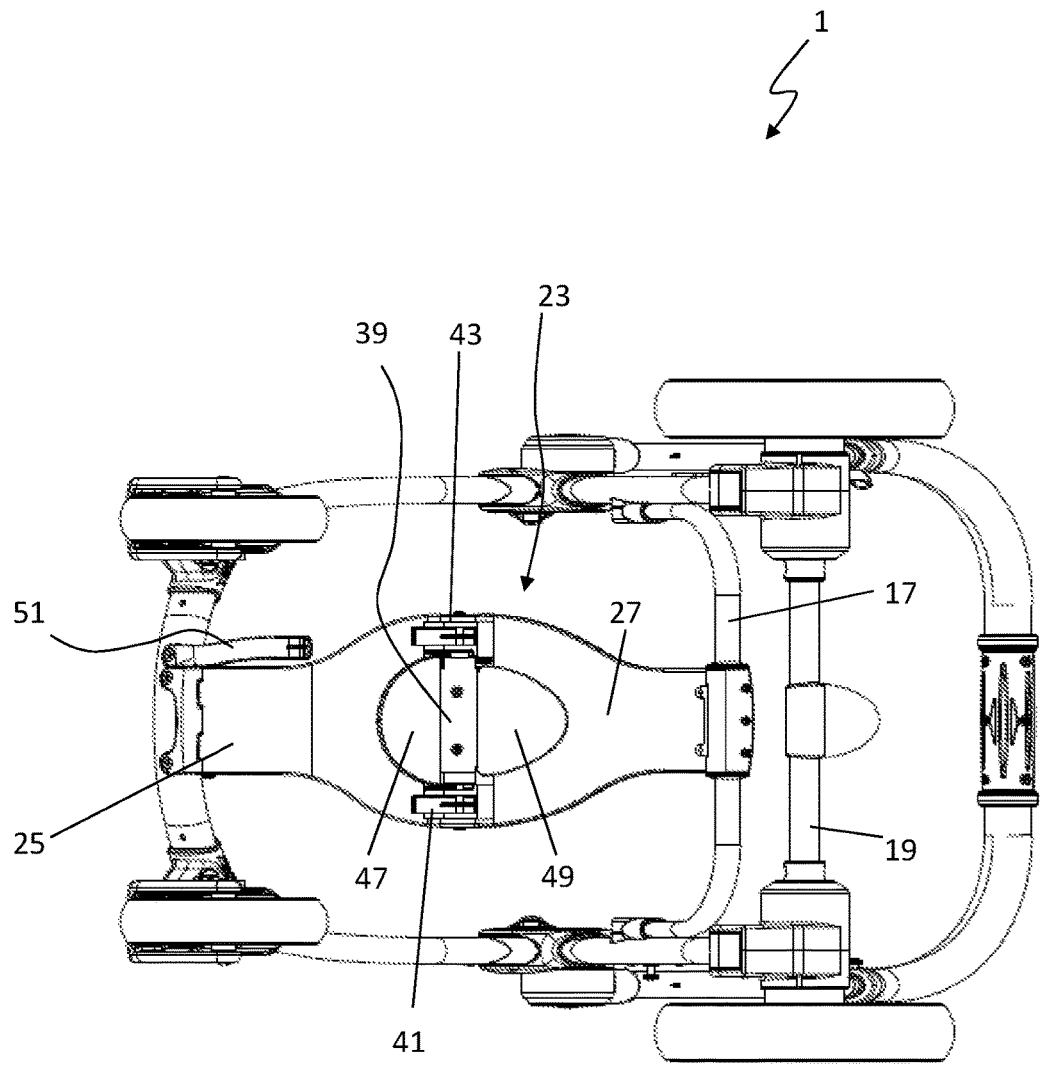
FIG. 4 is an underside view of the foldable stroller frame shown in FIG. 1.
Figure 5:
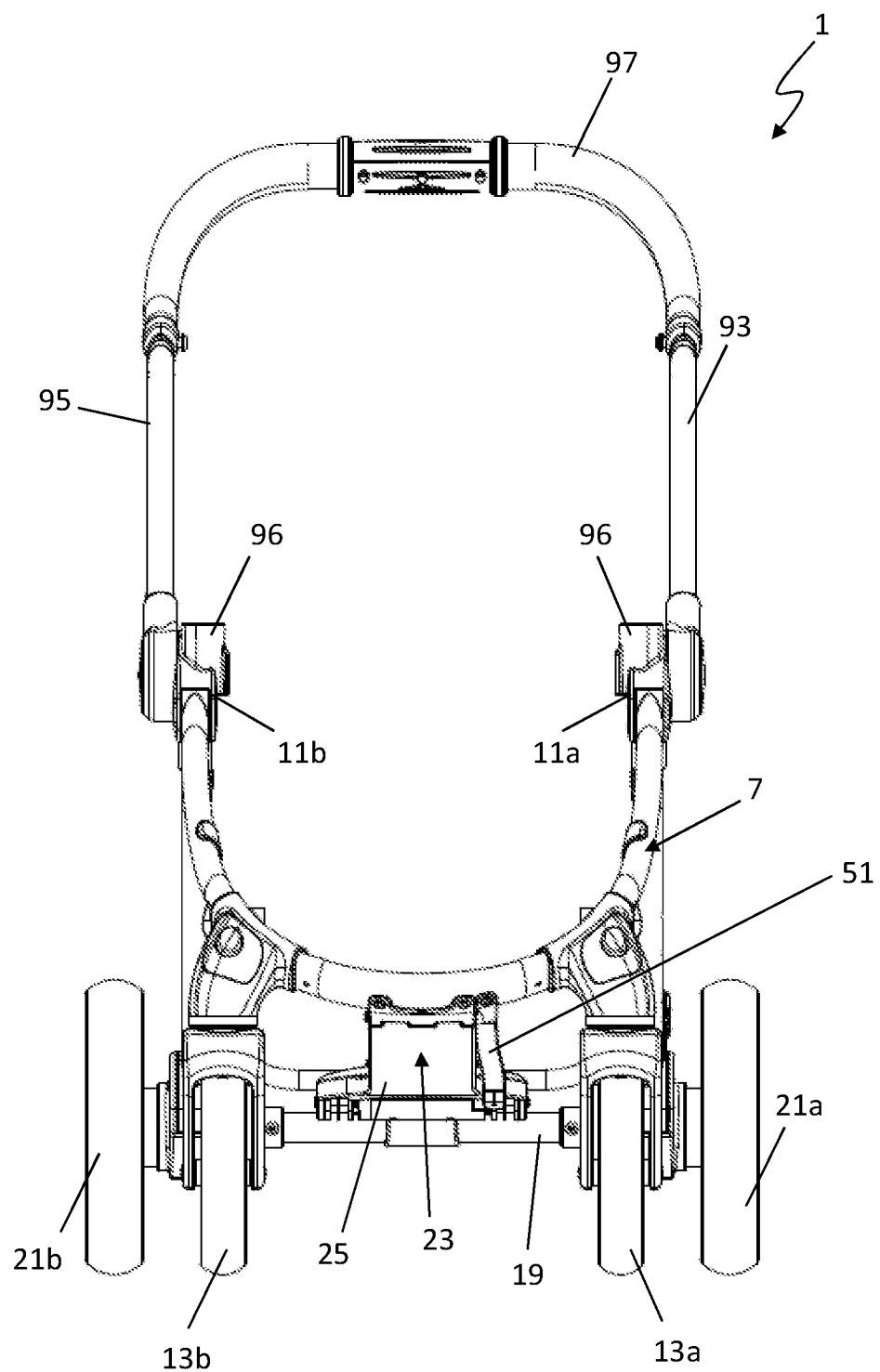
FIG. 5 is a front view of the foldable stroller frame shown in FIG. 1.
Figure 6:
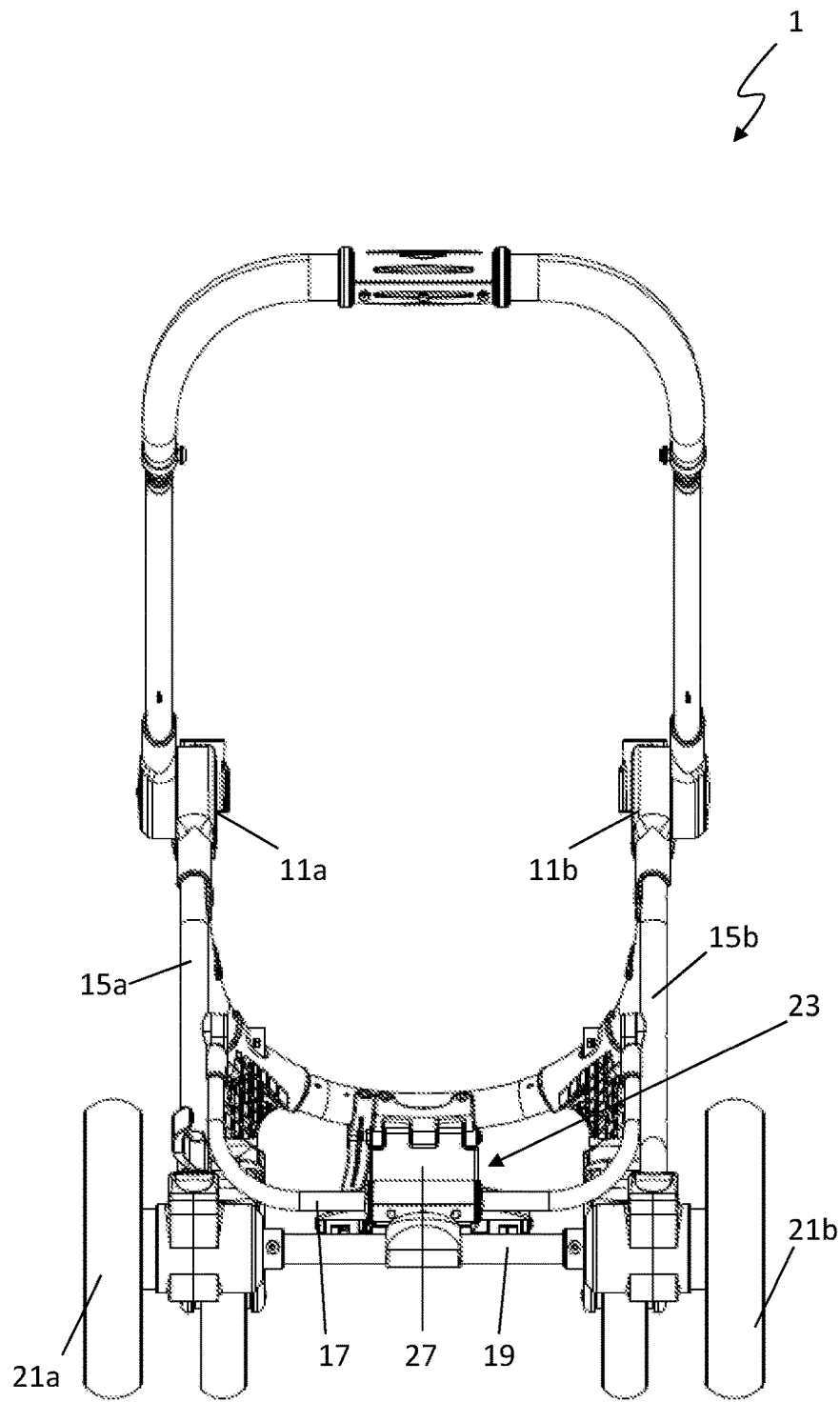
FIG. 6 is a rear view of the foldable stroller frame shown in FIG. 1.
Figure 7:
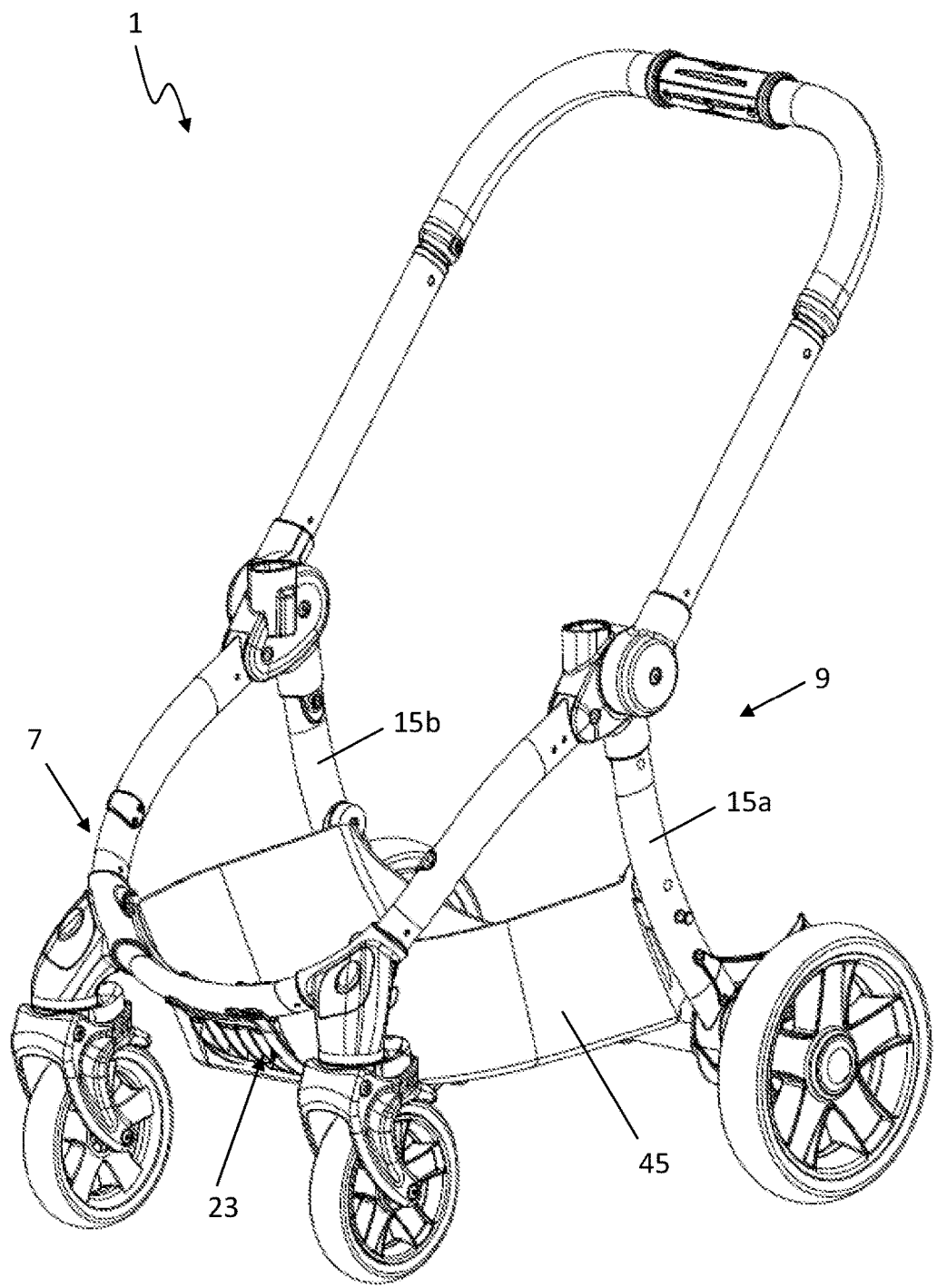
FIG. 7 is a front perspective view of the foldable stroller frame shown in FIG. 1 with a basket attached.
Figure 8:
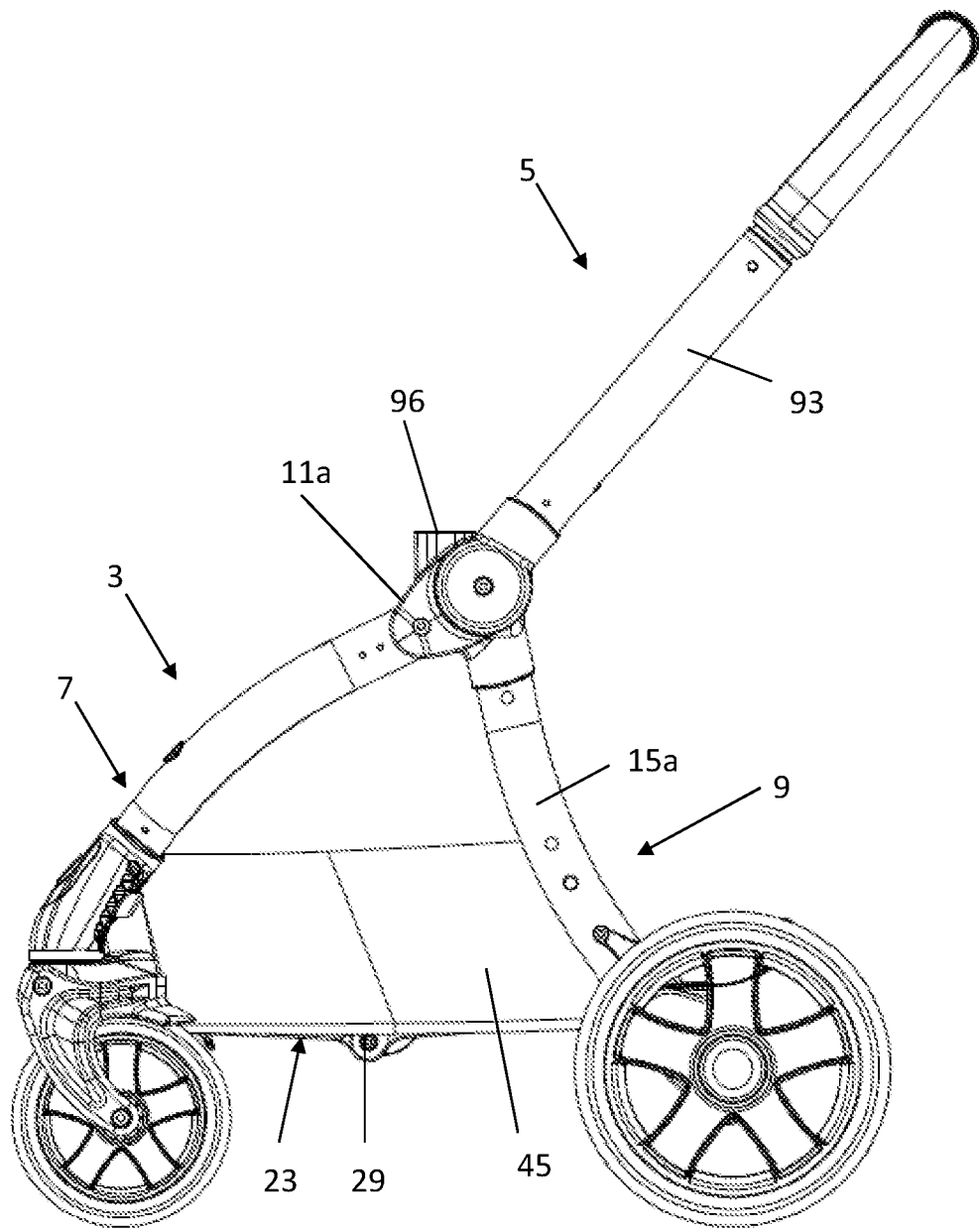
FIG. 8 is a side view of the foldable stroller frame and basket shown in FIG. 7.
Figure 11:
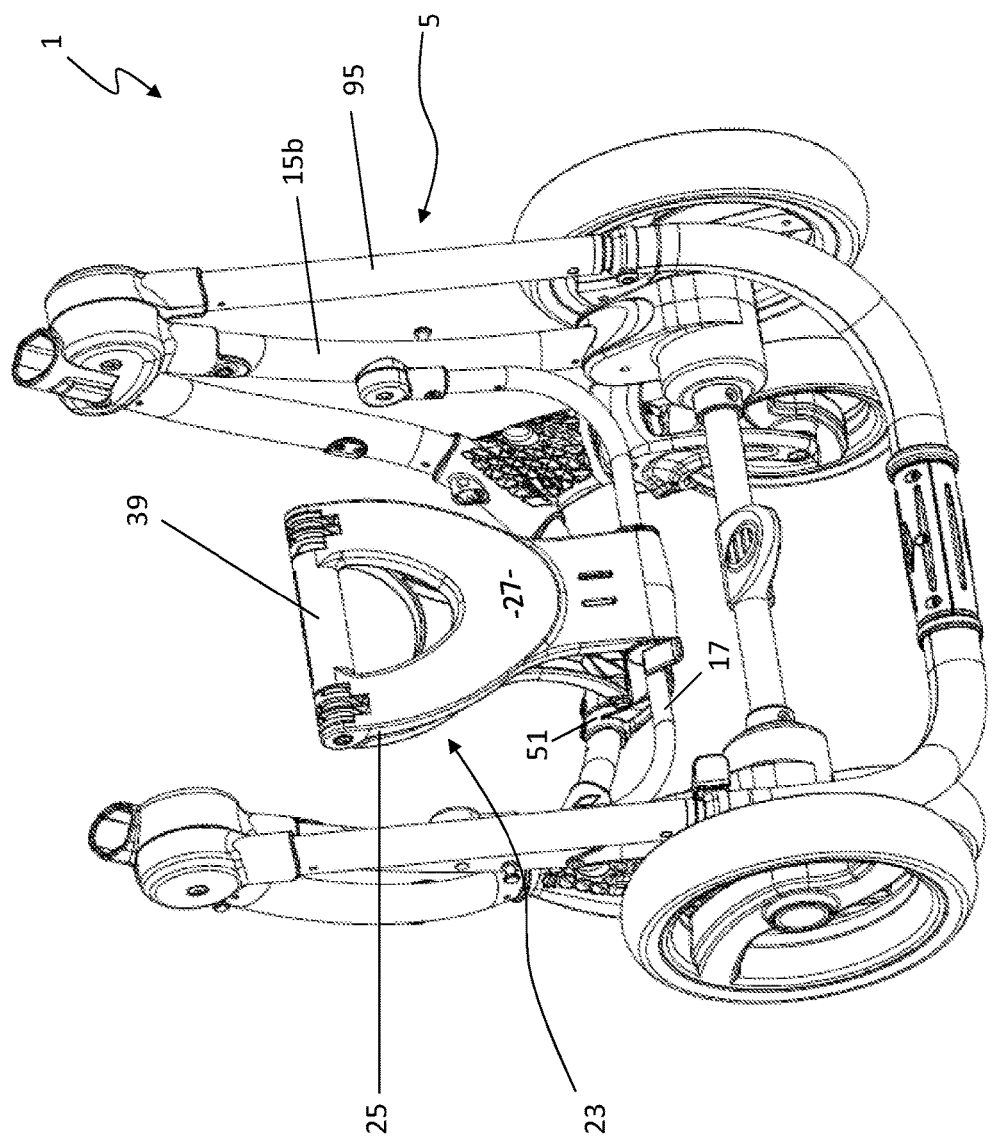
FIG. 11 is a perspective view of the foldable stroller frame according to the present invention, when in a collapsed state.

With particular reference to FIGS. 3, 7 and 8, the first hinge part 25 and the second hinge part 27 are shaped to have an upper surface which defines a support or platform upon which the base 71 of a basket 45 may sit. As shown in FIG. 3, the shape of the first and second hinge parts 25, 27 is chosen such that when they are pivotally coupled together a pair of apertures 47, 49 is formed either side of the handle 39 to permit fingers and thumbs to be inserted through the apertures 47, 49 and enable the handle to be grasped by a user. Since the hinge device 23 is pivotally attached at each end to the front and rear frame sections 7, 9 and is pivotal about the axis of rotation, pulling of the handle 39 in an upward direction, as indicated by arrow 31, moves the axis of rotation toward the hubs 11a, 11b which causes the front frame section 7 to pivot toward the rear frame section 9, thereby moving the lower frame 3 from a deployed state to a collapsed state, as shown in FIG. 11.

Figure 12:
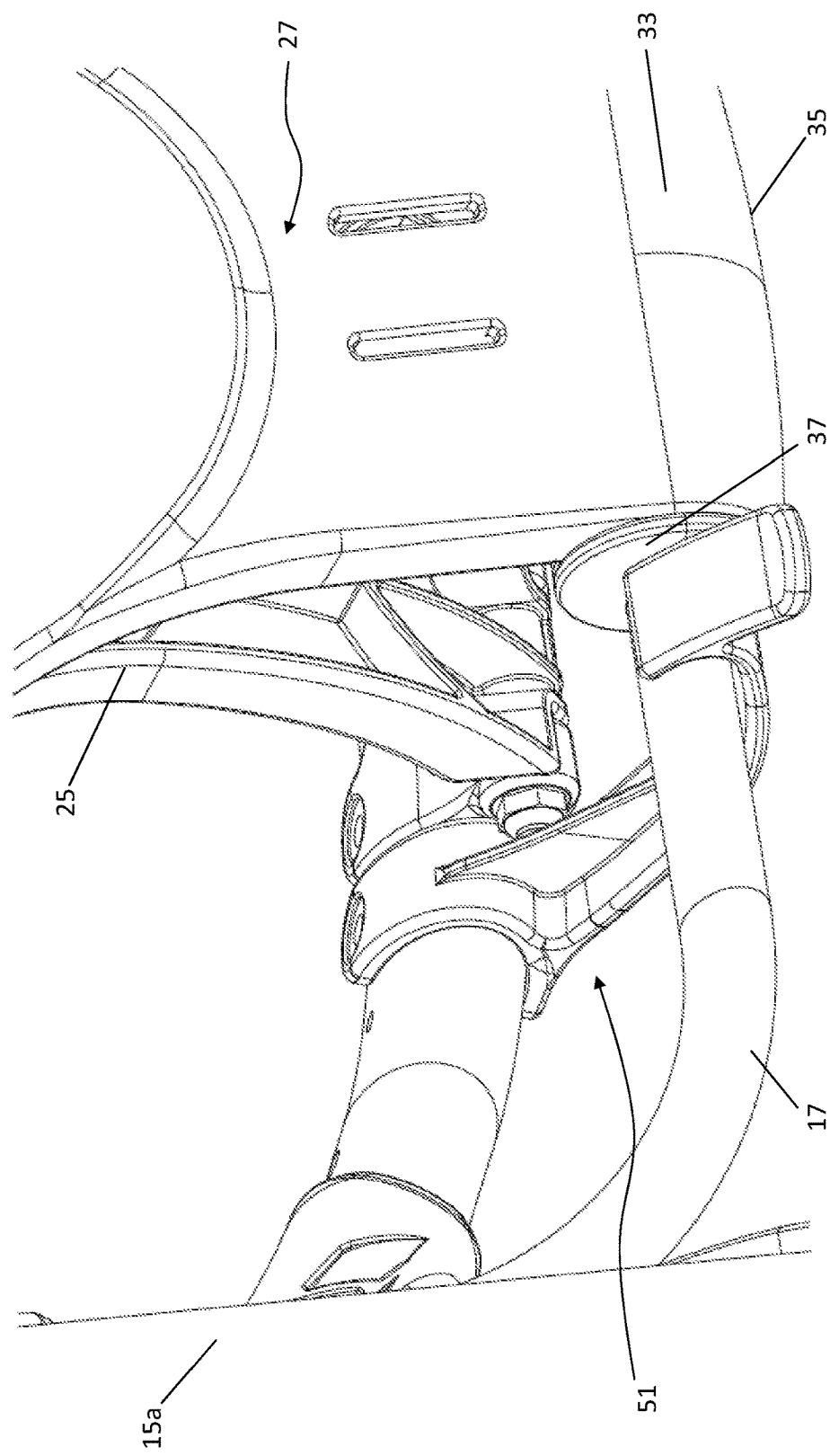
FIG. 12 is an enlarged view of a part of the foldable stroller frame shown in FIG. 11 with a schematic representation of a latch mechanism.

The lower frame 3 further comprises a latch mechanism 51 which extends from the front frame section 7 and which is shaped and configured to capture the cross brace 17 of the rear frame section 9 in the collapsed state and retain the lower frame 3 in the collapsed state by friction fit as schematically represented in FIG. 12. Releasing of the cross brace 17 from the latch mechanism 51 to permit the front and rear frame sections 7, 9 to move relative to one another enables the stroller frame 1 to be moved to the deployed state. Movement of the lower frame to the deployed state may be instigated by pushing the handle 39 in a downward direction away from the hubs 11a, 11b and/or allowing the hinge device 23 to move to the deployed state under the action of gravity and the spring biasing. It will be apparent to the skilled person that other retention means could be used.

Whilst a latch mechanism 51 is used in the above described embodiment to hold the lower frame 3 in the collapsed condition, with reference to FIG. 13, it is envisaged that the hinge device 123 may comprise a locking mechanism operable to lock the hinge device 123 and, hence the lower frame 3, in the deployed state. In such an embodiment, the first hinge part 125 and the second hinge part 127 each comprise mutually cooperating formations 141, 143, 153, 155 whereby one formation 141 of the first hinge part 125 interfaces with and forms a pair with one formation 153 of the second hinge part 127 when the first hinge part 125 and second hinge part 127 are coupled together. Likewise, the other formation 143 of the first hinge part 125 interfaces with the other formation of the second hinge part 127 to form a second pair. Each formation 141, 143, 153, 155 comprises a recess having a toothed surface, the recesses being shaped and configured such that when the formations interface and form respective pairs, the recesses of each pair define a space with a toothed surface. The formations 141, 143, 153, 155 are integrally formed with the first and second hinge parts 125, 127 respectively such that the formations of each pair are relatively rotatable.

A locking member 157, 159 in the form of a toothed wheel or cog is housed within the space of each pair. The cogs 157, 159 are movably mounted to the hinge pin 129 which extends through the centre of each cog 157, 159 so that the cogs 157, 159 may move in a direction along the length of hinge pin 129. The shape of the teeth of each cog 157, 159 is chosen to mesh with the toothed surface of each formation so that the cogs 157, 159 can engage the formations. The size of the space defined by the recesses is chosen such that the cogs 157, 159 can move along the hinge pin 129 between the two formations of a pair. The width of the cogs 157, 159 relative to the respective spaces is chosen such that the cogs 157, 159 can simultaneously engage the teeth of both formations in one position and engage the teeth of only one formation of a pair in a second position. Thus, in the first position, the cogs 157, 159 restrict relative rotational movement of the formations of each pair, hence restricting relative movement of the first and second hinge parts 125, 127. In the second position, since the cogs do not engage one formation of a pair of formations, the formations and, hence, the first and second hinge parts 125, 127 are free to rotate relative to one another between the deployed state and the collapsed state.

Whilst a single hinge pin 129 is used in the embodiment depicted, it is envisaged that more than one hinge pin could be used. For example, two hinge pins which are substantially axially aligned along the axis of rotation could be used to pivotally couple the first hinge part 125 to the second hinge part 127. In this alternative embodiment, one hinge pin could be provided to support at least part of the depressible button 161, a linkage 163 and a cog 157 on one side of the depressible button, whilst the other hinge pin could be provided to support at least part of the depressible button 161 and the other linkage 165 and cog 159 on the opposite side respectively of the depressible button 161.

A depressible button 161 is provided in the handle 139 and connected to each cog 157, 159 via linkages 163, 165 which are mounted to the hinge pin 129 and arranged between the depressible button 161 and a corresponding cog 157, 159. The linkages 163, 165 are linearly movable along the hinge pin 129 and each comprise a ramped surface 163a, 165a that interfaces with correspondingly ramped surfaces 167, 169 on the body of the depressible button 161. The ramped surfaces 163a, 163b, 167, 169 are relatively arranged such that when the button 161 is depressed and urged into the handle 139, the ramped surfaces 167, 169 of the button 161 urge the linkages 163, 165 to move in a direction toward the respective cogs 157, 159. Movement of the linkages 163, 165 towards the cogs 157, 159 forces the cogs to move from the first position to the second position and unlock the formations to permit relative rotation of the first and second hinge parts 125, 127. The cogs 157, 159 and linkages 163, 165 are spring biased toward the second position in which the first and second hinge parts 125, 127 are relatively rotationally locked so that when the depressible button 161 is released, the cogs 157, 159 return to the locked position.

In the embodiment depicted, the locking mechanism is configured to lock the hinge device 123 in the deployed condition and the latch mechanism 151 is configured to lock the hinge device 123 in the collapsed condition. However, it is envisaged that the locking mechanism could replace the latch mechanism 151 entirely such that the locking mechanism locks the hinge device and, hence, the stroller frame 1 in both the deployed and collapsed conditions. Such an arrangement is achievable by adapting the tooth layout on the cogs 157, 159 in relation to the tooth arrangement of the formations 141, 143 such that the teeth of the cogs 157, 159 are appropriately aligned with the teeth of the formations 141, 143 to be urged into engagement with the formations 141, 143 by spring biasing when in the collapsed condition.

Turning back to FIGS. 1 to 6, the upper frame 5 of the foldable stroller 1 forms a handle part 91 having a pair of telescopic side limbs 93, 95 to enable the length of the handle part 91 to be adjusted. The side limbs 93, 95 are connected at an upper end by a tubular cross member 97 which is wrapped with a leatherette for gripping by a user when maneuvering the pushchair. A lower end of each side limb 93, 95 is pivotally connected to the hub 11a, 11b to enable pivotal movement of the upper frame 5 relative to the lower frame 3. The upper frame 5 is therefore pivotal toward the lower frame 3 so that both the upper and lower frames 3, 5 can be arranged in a compact, collapsed configuration as shown, for example, in FIG. 11.

Figure 9:
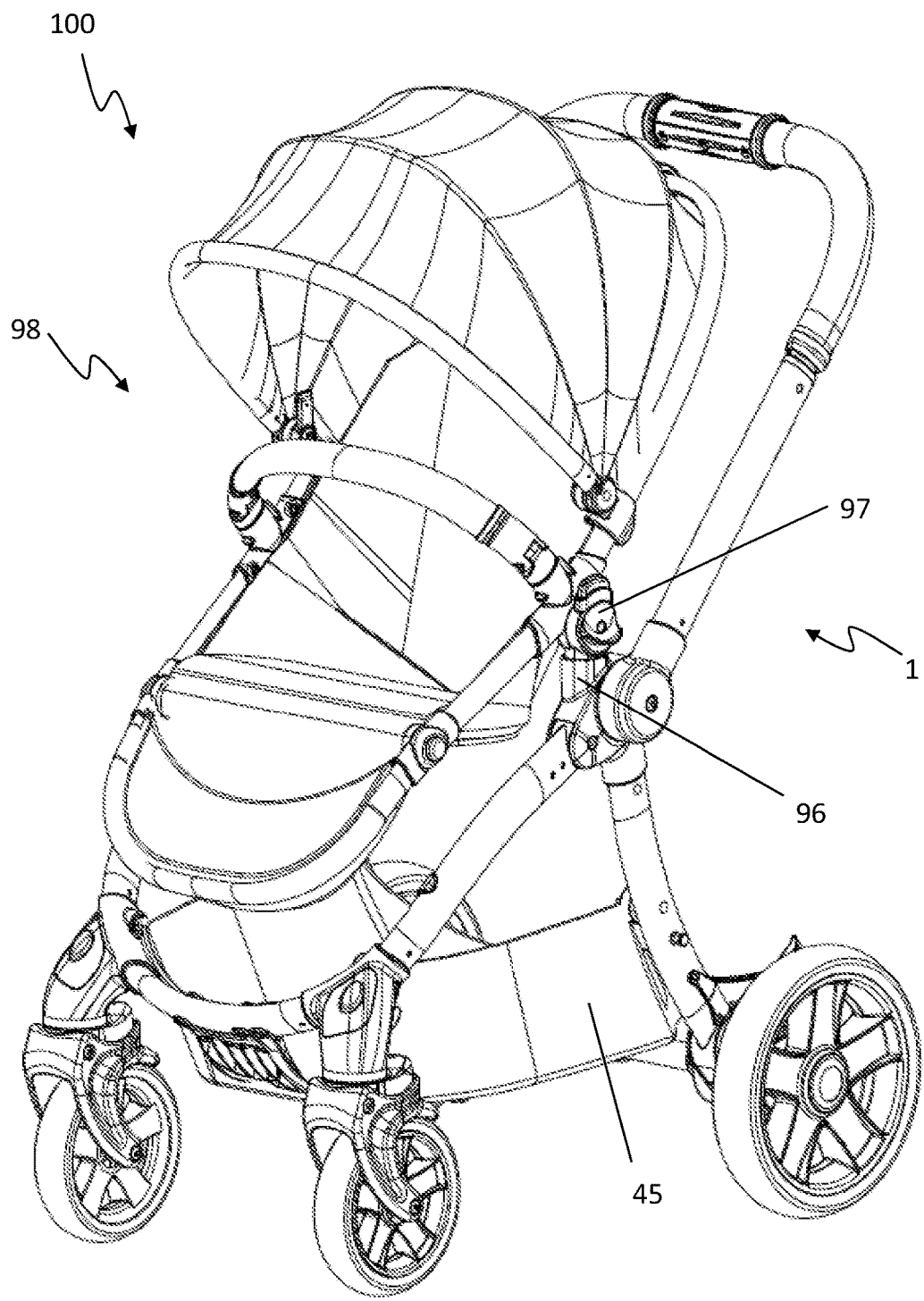
FIG. 9 is a front perspective view of the foldable stroller frame and basket shown in FIG. 7 with a stroller seat attached thereto.
Figure 10:
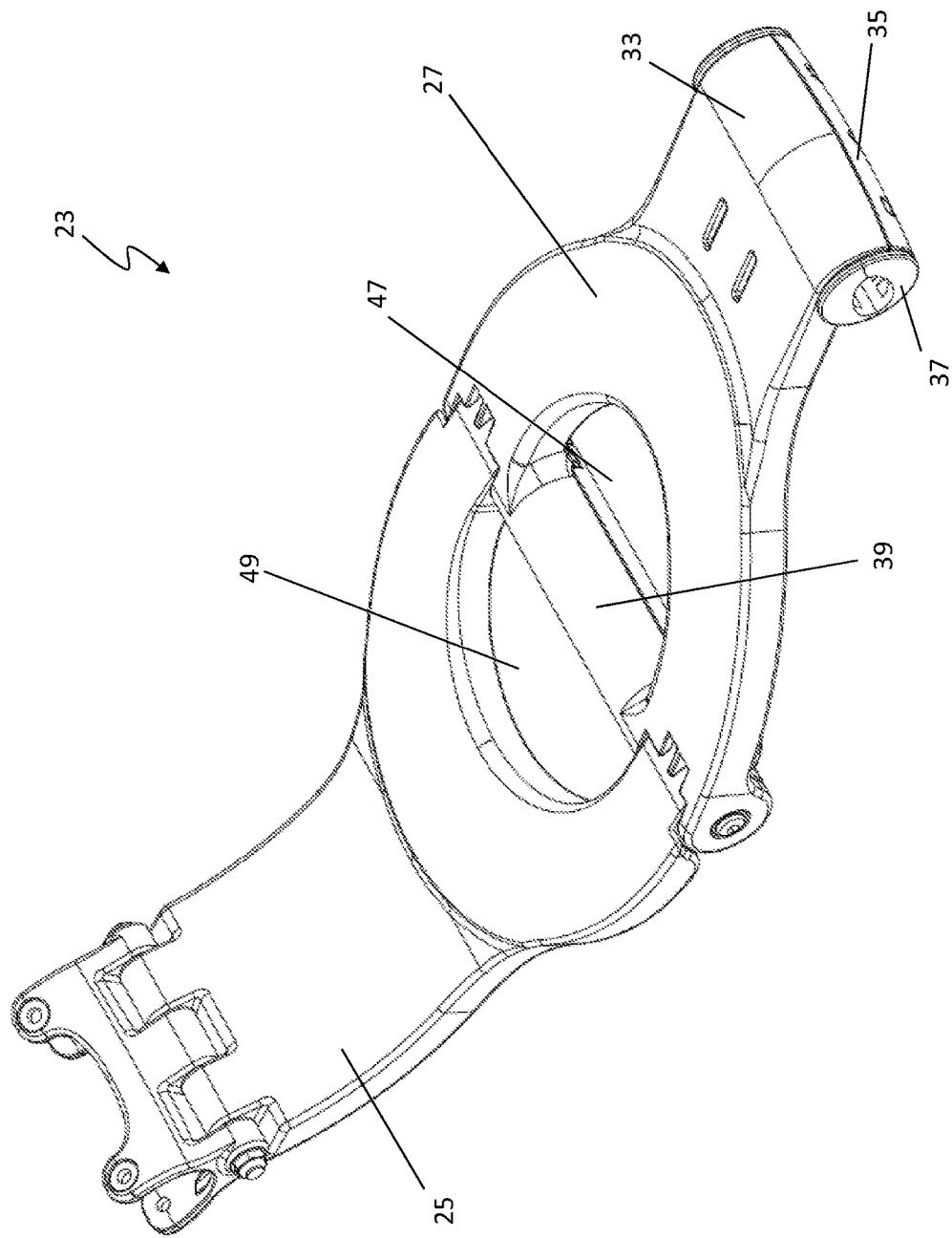
FIG. 10 is a perspective view of a hinge device of a foldable stroller frame according to the present invention.

The hubs 11a, 11b comprise integrally formed female receptacles 96 for receipt of male connecting parts 97 of a stroller seat 98. Thus, with reference to FIG. 9, a complete stroller 100 may be assembled by attaching the stroller seat 98 to the stroller frame 1.

Turning to FIGS. 14 to 22, the basket 45 comprises a base 71 through which is formed an aperture 73 located such that when the basket is positioned to sit on the hinge device 23, the aperture 73 is substantially aligned with the handle 39. Thus, the handle 39 is accessible to a user through the aperture 73 even when the basket 45 is positioned on top of the hinge device 23. An upper flap 75 of fabric material and a lower flap 77 of fabric material is hingedly attached to one edge of the aperture 73 so that the flaps 75, 77 can be arranged to cover and substantially close the aperture 73. Each flap 75, 77 is securable to the base 71 by hook and loop fasteners 79a, 79b, 81a, 81b arranged on the flaps 75, 77 and base, respectively. It will be apparent to the skilled person that other fastening means may be used such as buttons or snap fasteners.

Figure 21:
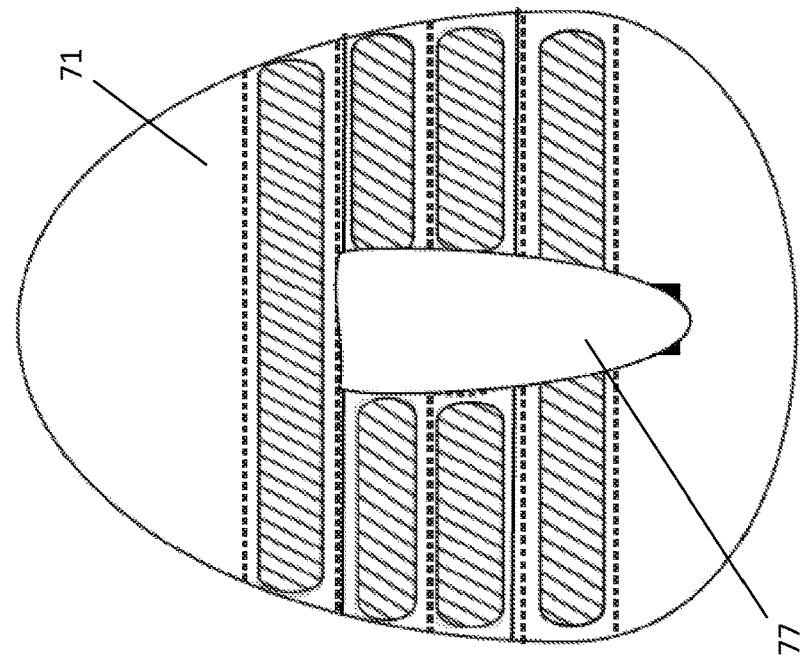
FIG. 21 shows an underside view of the base shown in FIG. 18 with underside flap in a closed configuration.
Figure 20:
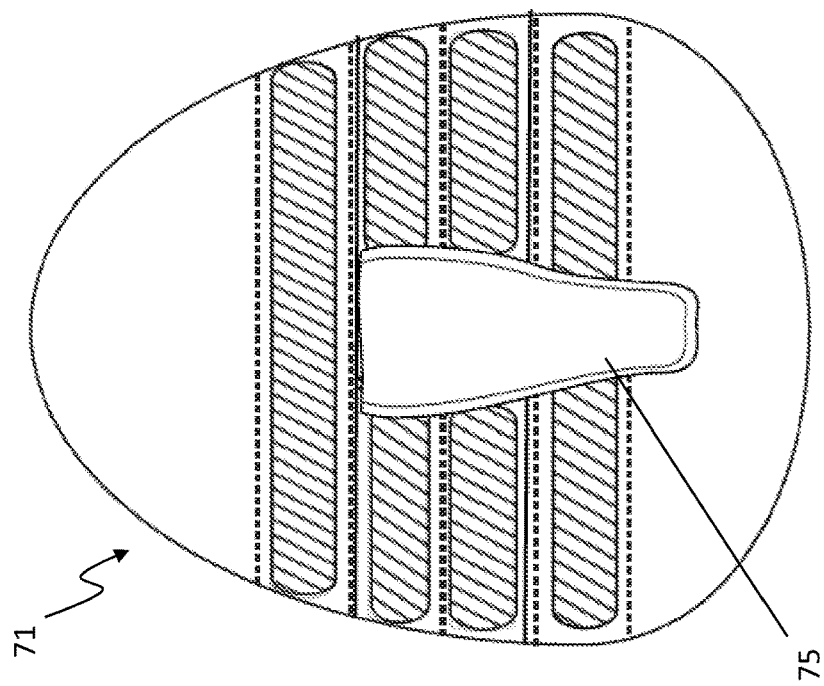
FIG. 20 shows a plan view of the base shown in FIG. 18 with upper flap in a closed configuration.
Figure 23:
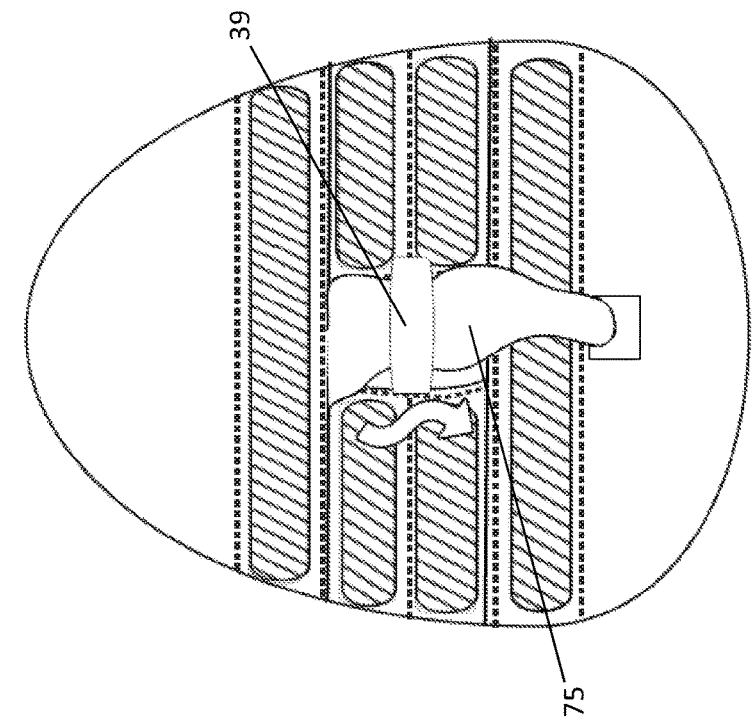
FIG. 23 shows a second stage of interaction with the foldable stroller frame shown in FIG. 1.
Figure 22:
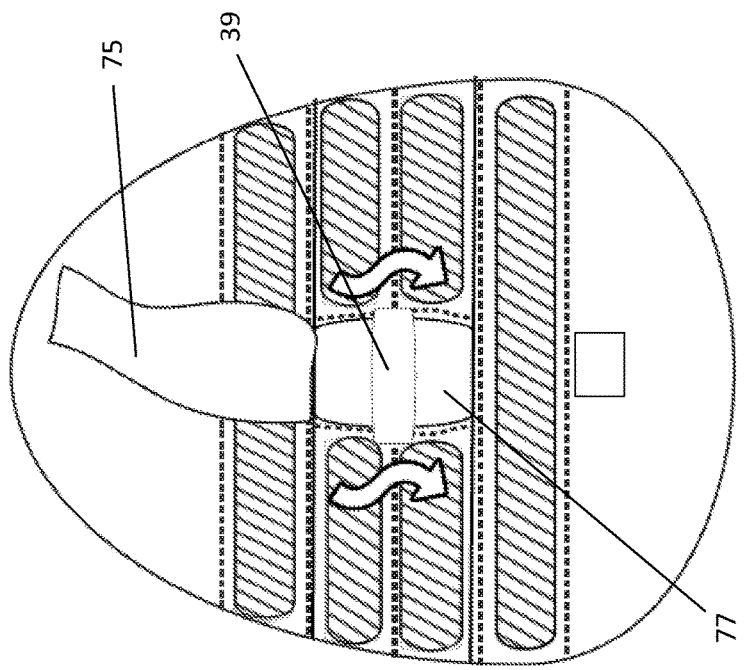
FIG. 22 is a plan view of the base shown in FIG. 18 at a first stage of interaction with the foldable stroller frame shown in FIG. 1.
Figure 28:
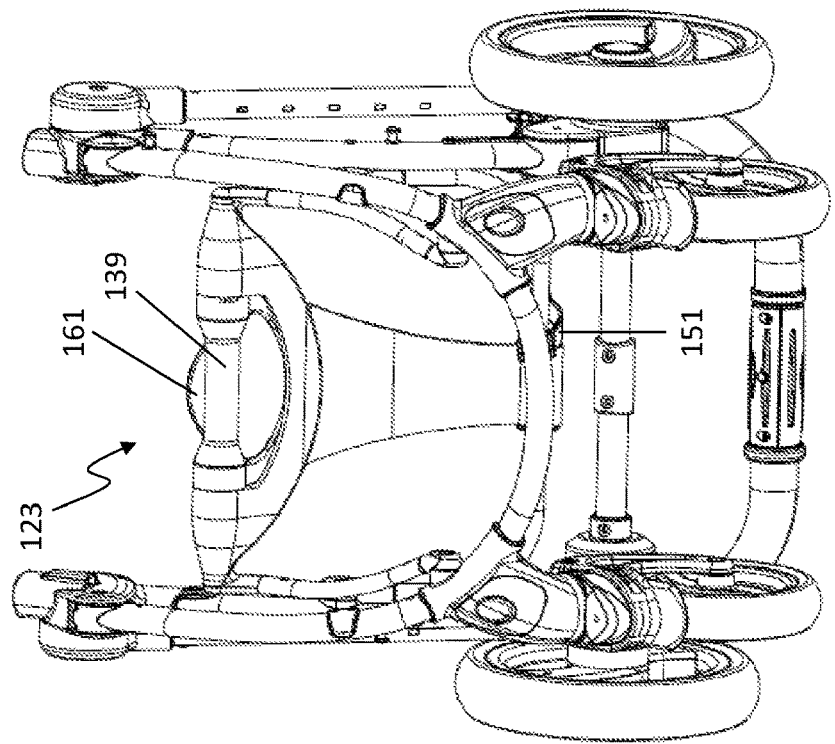
FIG. 28 is a perspective view of the foldable stroller frame shown in FIG. 27.
Figure 27:
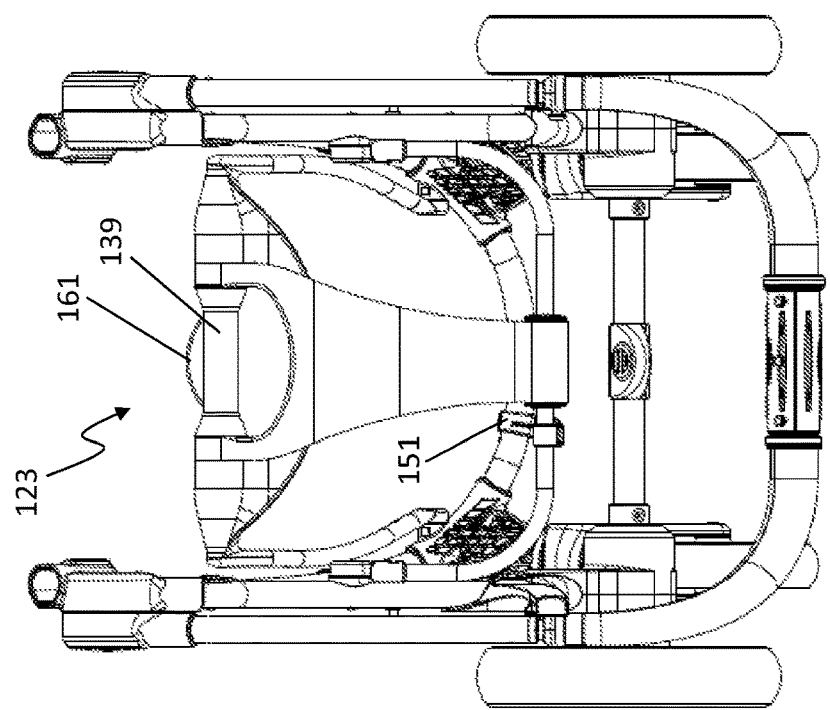
FIG. 27 is a front view of a foldable stroller frame according to the present invention comprising the hinge device shown in FIG. 13 and arranged in a collapsed state.

With particular reference to FIGS. 21 and 22, the lower flap 77 may be arranged to extend beneath the handle 39 when the basket is positioned to rest on the hinge device 23 and the handle extends through the aperture 73. The lower flap 77 may be secured in place to at least substantially close the aperture 73. The upper flap 75 may also be looped under the handle 39 and brought back around to be secured on the upper side of the base 71. Thus, the two flaps 75, 77 minimize the likelihood of items in the basket 45 falling through the aperture 73 whilst permitting easy access to the handle 39 for operation of the hinge device 23.

As shown in FIGS. 14 to 22, the base 71 further comprises a plurality of preformed folds 83 or weakened regions which extend across the width of the base 71 in a direction substantially parallel to the longitudinal axis of the handle 39 and hence the axis of rotation. The folds 83 are provided to cause the base 71 to preferentially fold along the folds 83 when the lower frame is moved from a deployed position to a collapsed position. The folds 83 are spaced apart to define segments 85 which are arranged to concertina together in a folding operation as shown most clearly in FIGS. 24 and 25. The segments 85 are reinforced by correspondingly shaped strips of polyethylene which are sewn into the base 39 and which are provided to maintain the shape and form of the segments 85 to encourage a smooth folding and concertina action. The folds 83 and segments 85 therefore permit the lower frame 3 to be collapsed without first having to remove the basket 45 and ensure that the basket 45 folds into a compact arrangement in the collapsed state.

In use, when it is desired to collapse the foldable stroller frame 1 into a compact arrangement, the upper frame 5 is pivoted in a rearward, downward direction relative to the lower frame 3 until the side limbs 93, 95 of the upper frame 5 are substantially parallel to the rear side limbs 15a, 15b of the rear frame section 7. A user grasps the handle 39 and pulls in an upward direction toward the hubs 11a, 11b thereby causing the hinge device 23 to rotate about the axis of rotation. Hinging of the hinge device 23 pulls the front frame section 7 toward the rear frame section 9 and collapses the lower frame 3. In this position, the latch mechanism 51 latches onto the cross brace 17 and retains the front frame section 7 relative to the rear frame section 9 as shown in FIGS. 11 and 12. When the stroller frame 1 is in the collapsed condition shown in FIG. 11, the frame can be conveniently carried via the handle 39.

When it is desired to deploy the stroller frame 1, the latch mechanism 51 is released and the handle 39 is pushed in a downward direction away from the hubs 11a, 11b. The expansion of the hinge device 23 urges the front frame section 7 to pivot away from the rear frame section 9 until the front and rear frame sections 7, 9 and the hinge device 23 reach the fully deployed position and are stopped by their respective stops. The upper frame 5 may then be pivotally rotated in an upward direction until it reaches a deployed position for maneuvering the stroller frame 1. Attaching the stroller seat 98 to the receptacles 96 of the stroller frame 1 completes the assembly of the stroller 1 for transportation of a baby or infant.

The above embodiments are described by way of example only. It would be appreciated that variations are possible without departing from the scope of the invention as defined in the appended claims.

What is claimed is:

1. A foldable stroller frame comprising a lower frame, the lower frame comprising:
    a front frame section having an end portion with at least one or more ground engaging wheels connected thereto,
    a rear frame section having an end portion with at least two ground engaging wheels connected thereto, the front frame section being pivotally connected to the rear frame section, and
    a hinge device extending from the end portion of the front frame section to the end portion of the rear frame section,
    wherein the hinge device comprises at least two coupled parts rotatable about a movable axis of rotation, said coupled parts configured to position the axis of rotation forward of the pivotal connection between the front and rear section, and
    a handle arranged along the movable axis of rotation for grasping by a user to operate the hinge device for pivotal movement of the front frame section relative to the rear frame section between a deployed state and a collapsed state.

2. A foldable stroller frame as claimed in claim 1, wherein the hinge device defines a surface for supporting a basket in the deployed state.

3. A foldable stroller frame as claimed in claim 1, wherein the hinge device is pivotally attached to the front frame section and the rear frame section.

4. A foldable stroller frame as claimed in claim 1, wherein the lower frame further comprises a latch mechanism operable to latch the front frame section to the rear frame section in the collapsed state.

5. A foldable stroller frame as claimed in claim 1, wherein the hinge device forms a brace between the front frame section and the rear frame section in the deployed state.

6. A foldable stroller frame as claimed in claim 1, further comprising a basket having a base with an aperture through which the handle may be grasped.

7. A foldable stroller frame as claimed in claim 6, wherein the base further comprises one or more flaps or fasteners to at least substantially close the aperture.

8. A foldable stroller frame as claimed in claim 6, wherein the base further comprises one or more preformed folds extending in a direction substantially parallel to the movable axis of rotation of the hinge device such that the base is foldable along one or more of the preformed folds.

9. A foldable stroller frame as claimed in claim 8, wherein the base comprises a plurality of preformed folds spaced apart to define one or more segments arranged to concertina together upon folding of the base.

10. A foldable stroller frame as claimed in claim 1, wherein two coupled parts of the at least two coupled parts of the hinge device comprise interfacing formations which together define a space, each formation having one or more shaped features for engagement with one or more correspondingly shaped features of a locking member mounted within the space, wherein the locking member is moveable between an unlocked position in which the two coupled parts are relatively moveable and a locked position in which the two coupled parts are fixed relative to each other, the locking member engaging only one formation in the unlocked position and engaging both formations in the locked position.

11. A foldable stroller frame as claimed in claim 10, wherein the hinge device further comprises a depressible button for urging the locking member from the locked position to the unlocked position.

12. A foldable stroller frame as claimed in claim 11, wherein a linkage is arranged between the depressible button and the locking member and wherein the depressible button and the linkage comprise mutually engaging ramped surfaces arranged such that the linkage is urged by the depressible button to move the locking member from the locked position to the unlocked position upon depression of the depressible button.

13. A foldable stroller frame as claimed in claim 10, wherein the locking member is biased toward the locked position.

14. A foldable stroller frame as claimed in claim 10, wherein the locking member is mounted to a hinge pin of the hinge device.

15. A foldable stroller frame as claimed in claim 1, wherein the handle is arranged on one of the at least two parts of the hinge device.

16. A foldable stroller frame as claimed in claim 15, wherein the handle is integrally formed with one of the at least two parts of the hinge device.

17. A foldable stroller frame as claimed in claim 1, wherein the hinge device is biased toward the deployed state.

18. A stroller comprising a foldable stroller frame as claimed in claim 1 and one or more seats attached to the foldable stroller frame.

19. A method of folding a foldable stroller frame having a lower frame comprising two pivotally connected frame sections linked by a hinge device, the hinge device having a handle arranged along an axis of rotation of the hinge device, wherein said axis of rotation is disposed forwardly with respect to the pivotal connection of the frame sections when the stroller is in a deployed state, the method comprising the steps of:

reaching through an aperture formed in a base of a basket mounted on the stroller frame to grasp the handle; and
pulling the handle in an upward direction to cause the hinge device to draw the pivotally connected frame sections together into a collapsed state.

20. The method of claim 19, further comprising the step of using the handle to carry the foldable stroller frame in the collapsed state.

21. A foldable stroller frame comprising a lower frame, the lower frame comprising a front frame section, a rear frame section and a hinge device linking the front frame section to the rear frame section, the front frame section being pivotally connected to the rear frame section, wherein the hinge device comprises at least two coupled parts rotatable about a movable axis of rotation and a handle arranged along the movable axis of rotation for grasping by a user to operate the hinge device for pivotal movement of the front frame section relative to the rear frame section between a deployed state and a collapsed state;
wherein the lower frame further comprises a latch mechanism operable to latch the front frame section to the rear frame section in the collapsed state; and
wherein two coupled parts of the at least two coupled parts of the hinge device comprise interfacing formations which together define a space, each formation having one or more shaped features for engagement with one or more correspondingly shaped features of a locking member mounted within the space, wherein the locking member is moveable between an unlocked position in which the two coupled parts are relatively moveable and a locked position in which the two coupled parts are fixed relative to each other, the locking member engaging only one formation in the unlocked position and engaging both formations in the locked position.

22. A foldable stroller frame as claimed in claim 1, wherein:
the rear frame section comprises two spaced apart side limbs joined by a cross brace, the cross brace being disposed adjacent said rear frame section end portion;
the front frame section comprises two spaced apart members and a cross member, each said spaced apart member extending from a pivotal connection to said front frame section end portion, and said cross member joining said two spaced apart members in said front frame section end portion; and
one coupled part of the hinge device is pivotally connected to the rear frame section cross brace and the second coupled part of the hinge device is pivotally connected to the front frame section cross member.

23. A foldable stroller frame as claimed in claim 22, wherein front wheel support structures are connected to the front frame section between each said spaced apart member and the cross member.

* * * * *